United States Patent
Kaneko et al.

[11] Patent Number: 6,041,591
[45] Date of Patent: Mar. 28, 2000

[54] EXHAUST GAS HEATING SYSTEM FOR IN-CYLINDER INJECTION INTERNAL COMBUSTION ENGINE

[75] Inventors: Katsunori Kaneko; Kazuo Koga; Taizo Kitada; Hiromitsu Ando, all of Okazaki, Japan

[73] Assignee: Mitsubishi Jidosha Kogyo Kabushiki Kaisha, Tokyo, Japan

[21] Appl. No.: 08/887,218

[22] Filed: Jul. 2, 1997

[30] Foreign Application Priority Data

Jul. 2, 1996  [JP]  Japan .................................. 8-172661

[51] Int. Cl.[7] .................................. F01N 3/08; F01N 3/20
[52] U.S. Cl. .................................. 60/274; 60/284; 60/285; 123/300
[58] Field of Search .................................. 60/274, 284, 285, 60/286; 123/299, 300

[56] References Cited

U.S. PATENT DOCUMENTS

| | | | |
|---|---|---|---|
| 4,452,040 | 6/1984 | Kobashi | 60/285 X |
| 5,207,058 | 5/1993 | Sasaki et al. | 60/284 |
| 5,343,702 | 9/1994 | Miyajima et al. | 60/285 |
| 5,479,775 | 1/1996 | Kraemer et al. | 60/285 X |
| 5,642,705 | 7/1997 | Morikawa et al. | 123/300 X |

*Primary Examiner*—Tony M. Argenbright

[57] ABSTRACT

An exhaust gas heating system for an in-cylinder injection internal combustion engine is disclosed. The system includes a fuel injection device for injecting fuel directly into a combustion chamber of the engine, a spark plug for subjecting fuel, which has been injected as primary fuel from the injection device, to spark ignition such that the primary fuel undergoes primary combustion, an exhaust gas purification device arranged in an exhaust passage of the engine, a purification device temperature computing unit for determining a temperature of the purification device by detecting or estimating the temperature of the purification device, and an additional fuel injection control unit for controlling the injection device when the purification device is found to require activation from the temperature determined by the computing unit, such that an injection of fuel as additional fuel is performed during a flame lasting duration that a flame of the primary combustion remains. The control unit includes an injection timing setting unit for setting an injection start time of the additional fuel on a basis of a parameter which affects the flame lasting duration.

29 Claims, 17 Drawing Sheets

EXHAUST GAS HEATING SYSTEM FOR IN-CYLINDER INJECTION INTERNAL COMBUSTION ENGINE

BACKGROUND OF THE INVENTION a) Field of the Invention

This invention relates to an exhaust gas heating system for an in-cylinder injection internal combustion engine, in which fuel is injected directly into a combustion chamber, so that heating of exhaust gas from the engine is effected by controlling the injection of fuel. In particular, this invention is concerned with an exhaust gas heating system for an in-cylinder injection internal combustion engine, which is suited for use in heating an exhaust gas purification device (especially, a lean NOx catalyst).

b) Description of the Related Art

As a method for heating exhaust gas in an in-cylinder injection internal combustion engine of the type that fuel is injected directly into a combustion chamber, a technique is proposed, for example, in Japanese Patent Application Laid-Open (Kokai) No. HEI 4-183922 that with a view to promptly activating a catalyst, the catalyst is promptly heated to an activation temperature by re-actuating a fuel injection valve to perform injection of additional fuel while an intake valve is still closed, namely, in an expansion stroke or exhaust stroke of the engine and then re-energizing a spark plug in the combustion chamber for the additional fuel to achieve ignition of the additional fuel or by mixing additional fuel into exhaust gas and igniting the additional fuel by a spark plug arranged in an exhaust passage.

Further, a technique is also proposed in Japanese Patent Application Laid-Open (Kokai) No. HEI 8-100638 that the temperature of exhaust gas is raised to activate a catalyst by performing an additional fuel injection (second fuel injection) in an initial to intermediate stage of an expansion stroke of primary combustion after an injection of primary fuel (first fuel injection) and its ignition, igniting the fuel, which has been injected by the second fuel injection, by a flame propagated from the primary combustion and further by performing a further additional fuel injection (third fuel injection) at a timing that the fuel, which has been injected by the further additional fuel, can be ignited by a flame propagated from the combustion by the second fuel injection.

According to the second-mentioned technique, the injection start time of the second fuel injection (additional fuel injection) is set at an optimal time immediately before the primary combustion by the first combustion injection (primary fuel injection) ends, that is, within a range from 10° to 80° after top dead center (an optimal range of the injection timing for the second injection is from 30° to 60° after top dead center), so that the additional fuel by the second fuel injection is ignited by a flame propagated from the primary combustion to raise the temperature of exhaust gas for the activation of the catalyst.

In addition, the second-mentioned technique is also designed to keep the specific fuel consumption low by choosing the heating of exhaust gas based on the second fuel injection or the heating of exhaust gas based on retardation of the ignition timing of the primary combustion as needed depending on the value of a target temperature of exhaust gas set by an exhaust-gas-heating-method-selecting unit. Specifically, it is controlled to perform the second, i.e., additional fuel injection when the setting of the target temperature of exhaust gas is 300° or higher and to perform the retardation of the ignition timing for the primary combustion when the setting of the target temperature of exhaust gas is lower than 300°.

According to the technique of Japanese Patent Application Laid-Open (Kokai) HEI 4-183922, however, the spark plug in the combustion chamber is re-energized or the additional spark plug is arranged in the exhaust passage, so that the additional fuel is caused to burn to heat the exhaust gas. Re-energization of the spark plug in the combustion chamber is however accompanied by drawbacks that an ignition control logic becomes complex and no sufficient energy can be assured for the second ignition. Any attempt to assure sufficient ignition energy involves a problem that use of a larger igniter becomes indispensable, leading to higher manufacturing cost. On the other hand, the use of the spark plug arranged in the exhaust passage for the ignition of the additional fuel is also accompanied by a problem that it leads to an increase in the number of parts and also to an increase in manufacturing cost.

The technique of Japanese Patent Application Laid-Open (Kokai) No. HEI 4-183922 is designed to ignite the additional fuel by using the spark plug arranged in the exhaust passage. In an in-cylinder injection internal combustion engine, however, the fuel injected by a primary fuel injection usually undergoes substantially complete combustion during an expansion stroke and an exhaust stroke so that co and HC, which may become combustible sources, remain only at low concentrations within the cylinder. Moreover, in the case of a fuel which is low in self-ignition property (for example, gasoline), substantial energy (for example, heat, pressure, temperature and/or the like) is needed to achieve combustion. Even when the fuel injection valve is simply re-activated in an expansion stroke or exhaust stroke to perform an injection of additional fuel and the additional fuel is then ignited by the spark plug as in the conventional technique, there is a potential problem that sufficient energy may not be produced and combustion of the additional fuel may not take place accordingly. The heating of exhaust gas therefore may not be assured, resulting in a potential problem that the catalyst may not be promptly activated.

According to the technique of Japanese Patent Application Laid-Open (Kokai) No. HEI 8-100638, the injection quantity and timing of the second fuel injection are determined from a basic fuel injection quantity of the first fuel injection and an engine speed. In other words, the injection quantity of the second fuel injection is determined based on the basic fuel injection quantity of the first fuel injection, and in regard to the injection timing of the second fuel injection, a map is stored beforehand by an experiment while using the basic injection quantity of the first fuel injection and the engine speed as parameters, and an optimal injection timing corresponding to operation conditions is determined from the map.

Since the flame lasting duration of the primary combustion by the primary fuel injection (the first fuel injection) varies due to changes in various parameters of the engine (for example, the engine temperature, the exhaust gas recirculation rate at the time of the primary combustion, the air/fuel ratio (A/F) at the time of primary combustion, the ignition timing at the time of the primary combustion, etc.), the additional fuel injected by the additional fuel injection (the second fuel injection) may not be surely ignited by the flame propagated from the primary combustion in some instances.

Further, according to the technique of Japanese Patent Application Laid-Open (Kokai) No. HEI 8-100638, either the heating of exhaust gas by the second fuel injection or the heating of exhaust gas by retardation of the ignition timing of the primary combustion is chosen as needed depending on the value of the target temperature of the exhaust gas set at the exhaust-gas-heating-method-selecting unit. Even when additional fuel is injected or the ignition timing of primary combustion is retarded, the resulting thermal energy may be used in a significant proportion for the work required to depress the piston (gas expansion work) in some instances. This makes it impossible to effectively use the resultant thermal energy for heating the exhaust gas, leading to a problem that the temperature of the exhaust gas cannot be raised efficiently.

SUMMARY OF THE INVENTION

The present invention has been completed in view of such problems. An object of the present invention is therefore to achieve a reliable combustion of additional fuel by a flame propagated from primary combustion without arrangement of any additional device while taking into consideration a flame lasting duration of the primary combustion corresponding to various parameters of an engine, so that the resulting thermal energy is effectively used to heat exhaust gas and is hence efficiently employed to heat an exhaust gas purification device. Another object of the present invention is to adjust the flame lasting duration of the primary combustion by adjusting the various parameters of the engine, so that the thermal energy obtained by the combustion of the additional fuel is used to effectively heat the exhaust gas and hence to efficiently heat the exhaust gas purification device.

Therefore, an exhaust gas heating system according to one aspect of the present invention for an in-cylinder injection internal combustion engine comprises a fuel injection device for injecting fuel directly into a combustion chamber of the internal combustion engine, a spark plug for subjecting fuel, which has been injected as primary fuel from the fuel injection device, to spark ignition so that the primary fuel undergoes primary combustion, an exhaust gas purification device arranged in an exhaust passage of the internal combustion engine, a purification device temperature computing unit for determining a temperature of the exhaust gas purification device by detecting or estimating the temperature of the exhaust gas purification device, and an additional fuel injection control unit for controlling the fuel injection device when the exhaust gas purification device is found to require activation from the temperature determined by the purification device temperature computing unit, so that an injection of fuel as additional fuel is performed during a flame lasting duration that a flame of the primary combustion based on the injection of the primary fuel remains; and the additional fuel injection control unit includes an injection timing setting unit for setting an injection start time of the additional fuel on a basis of a parameter which affects the flame lasting duration.

The injection timing setting unit may preferably include an injection quantity computing unit for determining the injection quantity of the additional fuel on a basis of a directly- or indirectly-detected quantity of oxygen still remaining after the primary combustion, an injecting duration setting unit for setting an injecting duration, which corresponds to the injection quantity of the additional fuel determined by the injection quantity computing unit, and an injection start time setting unit for setting an injection start time of the additional fuel on the basis of the parameter which affects the flame lasting duration.

Preferably, the injection start time setting unit includes a basic injection start time setting unit for determining a basic injection start time on a basis of an engine speed and an engine load of the internal combustion engine, and a flame dying time computing unit for determining an injection start time correction factor on the basis of the parameter, which affects the flame lasting duration, while taking into consideration a flame dying time as an ending time of the flame lasting duration; and the injection start time setting unit sets the injection start time of the additional fuel on a basis of the basic injection start time determined by the basic injection start time setting unit and the injection start time correction factor determined by the flame dying time computing unit, so that the injection of the additional fuel is started at a timing where the additional fuel can be ignited by the flame of the primary combustion.

The flame dying time computing unit may preferably determines the injection start time correction factor on a basis of at least one of an engine temperature of the internal combustion engine, an exhaust gas recirculation rate at a time of the primary combustion, an air/fuel ratio at the time of the primary combustion and an ignition timing at the time of the primary combustion as the parameter which affects the flame lasting duration.

Preferably, the internal combustion engine includes an engine temperature detection unit for detecting the engine temperature, and the flame dying time computing unit includes a first injection start time correction map indicating a first injection start time correction factor which has been set while taking into consideration the flame dying time which advances as the engine temperature becomes lower, whereby the injection start time setting unit sets the injection start time of the additional fuel on a basis of the first injection start time correction factor which has been determined from the first injection start time correction map on the basis of the engine temperature detected by the engine temperature detection unit.

Preferably, the internal combustion engine is provided with an exhaust gas recirculation rate control unit for controlling an exhaust gas recirculation rate by opening or closing an on/off valve in an exhaust gas recirculation passage which communicates the exhaust passage and the intake passage with each other, and the flame dying time computing unit includes a second injection start time correction map indicating a second injection start time correction factor which has been set while taking into consideration the flame dying time which varies in accordance with the exhaust gas recirculation rate, whereby the injection start time setting unit sets the injection start time of the additional fuel on a basis of the second injection start time correction factor which has been determined from the second injection start time correction map on the basis of the exhaust gas recirculation rate controlled by the exhaust gas recirculation rate control unit.

Preferably, the internal combustion engine is provided with a conventional fuel injection control unit for controlling an injection of fuel at the time of the primary combustion in accordance with operation conditions of the internal combustion engine, and the flame dying time computing unit includes a third injection start time correction map indicating a third injection start time correction factor which has been set while taking into consideration the flame dying time which delays as an air/fuel ratio at the time of the primary combustion becomes leaner, whereby the injection start time setting unit sets the injection start time of the additional fuel on a basis of the third injection start time correction factor which has been determined from the third injection start time correction map on the basis of the air/fuel ratio at the time of the primary combustion by the conventional combustion injection control unit.

Preferably, the internal combustion engine is provided with an ignition timing control unit for controlling an ignition timing of the primary fuel, which has been injected from the fuel injection device, by the spark plug, and the flame dying time computing unit includes a fourth injection start time correction map indicating a fourth injection start time correction factor which has been set while taking into consideration the flame dying time which delays as an ignition timing at the time of the primary combustion is retarded, whereby the injection start time setting unit sets the injection start time of the additional fuel on a basis of the fourth injection start time correction factor which has been determined from the fourth injection start time correction map on the basis of the ignition timing set by the ignition timing control unit.

The injection start time setting unit may preferably set the injection start time of the additional fuel at a timing close to the flame dying time of the flame lasting duration.

Preferably, the injection start time setting unit includes a flame lasting duration adjusting unit for adjusting the flame lasting duration, the flame lasting duration adjusting unit has a control unit for adjusting a control amount for the parameter and a storage unit for storing flame lasting durations corresponding to predetermined control amounts for the parameter, whereby the flame lasting duration adjusting unit adjusts the flame lasting duration by obtaining from the storage unit one of the predetermined control amounts for the parameter, said one control amount being required to make the ending time of the flame lasting duration become equal to a flame dying time corresponding to a degree of activation required for the exhaust gas purification device, and then adjusting the parameter through the control unit to give the one control amount, and the injection start time setting unit sets the injection start time of the additional fuel within the flame lasting duration adjusted by the flame lasting duration adjusting unit.

Preferably, the internal combustion engine is provided with an exhaust gas recirculation rate control unit for controlling an exhaust gas recirculation rate by opening or closing an on/off valve in an exhaust gas recirculation passage which communicates the exhaust passage and the intake passage with each other, the storage unit includes a first map indicating flame dying times corresponding to control amounts for the exhaust gas recirculation rate, and the flame lasting duration adjusting unit obtains from the first map one of the control amounts on a basis of a flame lasting duration corresponding to a temperature determined by the purification device temperature computing unit, and controls the exhaust gas recirculation rate control unit through the control unit to give the one control amount.

Preferably, the internal combustion engine is provided with an ignition timing control unit for controlling an ignition timing of the spark plug, at which the primary fuel injected from the fuel injection device is subjected to spark ignition. The storage unit includes a second map indicating flame dying times corresponding to control amounts for the ignition timing of the primary combustion, and the flame lasting duration adjusting unit obtains from the second map one of the control amounts on a basis of a flame lasting duration corresponding to a temperature determined by the purification device temperature computing unit, and controls the ignition timing control unit through the control unit to give the one control amount.

Preferably, the internal combustion engine is provided with a conventional fuel injection control unit for controlling the fuel injection at the time of the primary combustion in accordance with operation conditions, the storage unit includes a third map indicating flame dying times corresponding to control amounts for the air/fuel ratio of the primary combustion, and the flame lasting duration adjusting unit obtains from the third map one of the control amounts on a basis of a flame lasting duration corresponding to a temperature determined by the purification device temperature computing unit, and controls the conventional fuel injection control unit through the control unit to give the one control amount.

The injection timing setting unit may include a first injecting duration correcting unit for correcting a basic injecting duration determined by the injecting duration setting unit in accordance with a temperature of the exhaust gas purification device determined by the purification device temperature computing unit.

Preferably, the first injecting duration correcting unit has a correcting factor setting unit for correcting the basic injecting duration by a first injecting duration correcting factor, which has been predetermined corresponding to the temperature of the exhaust gas purification device, so that the injection quantity of the additional fuel becomes smaller as the temperature of the exhaust gas purification device rises.

Preferably, the internal combustion engine include plural cylinders, and the first injecting duration correcting unit has a cylinder designating unit which, based on a cylinder number map preset corresponding to temperatures of the exhaust gas purification device, decreases a number of additional-injection-performed cylinders as the temperature of the exhaust gas purification device rises.

Preferably, the injecting duration setting unit includes a second injecting duration correcting unit which, by a second injecting duration correcting factor predetermined corresponding to the injection start time of the additional fuel in the expansion stroke of the primary combustion, corrects the basic injecting duration determined by the injecting duration setting unit so that an actual injection quantity conforms with the injection quantity of the additional fuel determined by the injection quantity computing unit.

Preferably, the additional fuel injection control unit includes an injection quantity computing unit for determining the injection quantity of the additional fuel on a basis of a directly- or indirectly-detected quantity of oxygen still remaining after the primary combustion, and the injection timing setting unit is provided with a divided injection start time setting unit which sets injection start times of plural divided injections so that the injection quantity of the additional fuel determined by the injection quantity computing unit is divided and injected in like plural portions.

When the injection quantity of the additional fuel is injected by dividing the same in N portions, the divided injection start time setting unit may preferably set an injection start time of an $N^{th}$ divided injection at a timing immediate before the exhaust valve opens.

Preferably, the injection timing setting unit is provided with an injecting duration setting unit which, when the injection quantity of the additional fuel is injected by dividing the same in N portions, sets an $N-1^{th}$ divided injecting duration and an $N^{th}$ divided injecting duration so that an $N-1^{th}$ divided injection quantity becomes smaller than an $N^{th}$ divided injection quantity.

Preferably, the injecting duration setting unit includes third injecting duration correcting factors predetermined corresponding to values of the engine temperature and, when the injection quantity of the additional fuel is injected by dividing the same in N portions, the injecting duration setting unit sets an N–1$^{th}$ divided injecting duration and an N$^{th}$ divided injecting duration by the third injecting duration correcting factors so that an N–1$^{th}$ divided injection quantity becomes still smaller than an N$^{th}$ divided injection quantity as the engine temperature rises.

Preferably, the injection start time setting unit sets the injection start time so that, when the temperature of the exhaust gas purification device determined by the purification device temperature computing unit is lower than a preset temperature permitting combustion of an unburnt fuel portion within the exhaust purification device, the injection of the additional fuel is effected within the flame lasting duration in which the flame of the primary combustion based on the injection of the primary fuel remains; and, when the temperature of the exhaust purification device is equal to or higher than the preset temperature, the injection start time setting unit sets the injection start time so that the injection of the additional fuel is performed after the flame lasting duration.

Further, an exhaust gas heating system according to another aspect of the present invention for an in-cylinder injection internal combustion engine comprises a fuel injection device for injecting fuel directly into a combustion chamber of the internal combustion engine, a spark plug for subjecting fuel, which has been injected as primary fuel from the fuel injection device, to spark ignition so that the primary fuel undergoes primary combustion, an exhaust gas purification device arranged in an exhaust passage of the internal combustion engine, and an additional fuel injection control unit for controlling the fuel injection device so that, when the exhaust gas purification device is found to require activation of a catalyst thereof, fuel is injected as additional fuel within a flame lasting duration in which a flame of the primary combustion remains, the additional fuel injection control unit includes an injection quantity computing unit for determining an injection quantity of the additional fuel on a basis of a directly- or indirectly-detected quantity of oxygen still remaining after the primary combustion, and an injection timing setting unit including an injecting duration setting unit for setting a basic injecting duration corresponding to the injection quantity of the additional fuel determined by the injection quantity computing unit, and an injection start time setting unit for setting an injection start time of the additional fuel on a basis of a parameter which affects the flame lasting duration, and the injection start time setting unit, upon starting up the internal combustion engine at a low temperature, sets the injection start time so that the injection of the additional fuel is effected within the flame lasting duration and, in an operation state from which the exhaust gas purification device is expected to be reduced in temperature, sets the injection start time so that the injection of the additional fuel is effected after the flame lasting duration.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(A) and 5(B) are flow charts for explaining fuel injection control by the exhaust gas heating system according to the first embodiment of the present invention for the in-cylinder injection internal combustion engine, in which FIG. 5(A) is a flow chart of control of a conventional fuel injection and FIG. 5(B) is a flow chart of control of an additional fuel injection;

FIGS. 6(A) through 6(D) are diagrams illustrating maps employed in the control of the additional fuel injection by the exhaust gas heating system according to the first embodiment of the present invention for the in-cylinder injection internal combustion engine, in which FIG. 6(A) is a first injection start time correction map (6A) showing a coolant temperature correction factor (first injection start time correction factor) Kθ, FIG. 6(B) is a second injection start time correction map (6B) depicting an exhaust gas recirculation rate correction factor (second injection start time correction factor) $K_E$, FIG. 6(C) is a third injection start time correction map (6C) indicating an air/fuel ratio correction factor (third injection start time correction factor) $K_F$, and FIG. 6(D) is a fourth injection start time correction map (6D) illustrating an ignition timing correction factor (fourth injection start time correction factor) $K_I$;

FIGS. 7(A) through 7(C) are diagrams illustrating maps for use in the control of an injection of additional fuel by the exhaust gas heating system according to the first embodiment of the present invention for the in-cylinder injection internal combustion engine, in which FIG. 7(A) is a map (7A) showing a flame lasting duration corresponding to a control amount for an exhaust gas recirculation rate (EGR rate) at the time of primary combustion, FIG. 7(B) is a map (7B) depicting a flame lasting duration corresponding to a control amount for an air/fuel ratio (A/F) at the time of primary combustion, and FIG. 7(C) is a map (7C) indicating a flame lasting duration corresponding to a control amount for an ignition timing $T_{IG}$ at the time of primary combustion;

FIGS. 8(A) through 8(C) are diagrams illustrating variations in heat release rate when additional fuel is injected by adjusting the control amounts for the respective parameters in the control of the injection of the additional fuel by the exhaust gas heating system according to the first embodiment of the present invention for the in-cylinder injection internal combustion engine, in which FIG. 8(A) shows variations when the exhaust gas recirculation is adjusted, FIG. 8(B) illustrates variations when the air/fuel ratio of the primary combustion is adjusted, and FIG. 8(C) depicts variations when the ignition timing of the primary combustion is adjusted;

FIGS. 17(A) through 17(D) are diagrams showing maps for use in the control of an injection of additional fuel by an exhaust gas heating system according to an embodiment of the present invention for the in-cylinder injection internal combustion engine, in which FIG. 17(A) is a map (17A) showing a second injecting duration correcting factor $K_1$ predetermined corresponding to an injection start time $T_{INJ}$, FIG. 17(B) is a map (17B) illustrating a first injecting duration correcting factor $K_2$ predetermined corresponding to a catalyst temperature $\theta c.c$, FIG. 17(C) is a cylinder number map (17C) preset corresponding to the catalyst temperature $\theta c.c$, and FIG. 17(D) is a map (17D) preset from an injection-performed cylinder number $N_{INJ}$, a coolant temperature $\theta w$ and a third injecting duration correcting factor $K_3$.

DESCRIPTION OF THE PREFERRED EMBODIMENTS

The embodiments of the present invention will hereinafter be described with reference to the accompanying drawings.

Referring first to FIGS. 1 through 9, a description will be made about the exhaust gas heating system according to the first embodiment of the present invention for the in-cylinder injection internal combustion engine.

Figure 3:
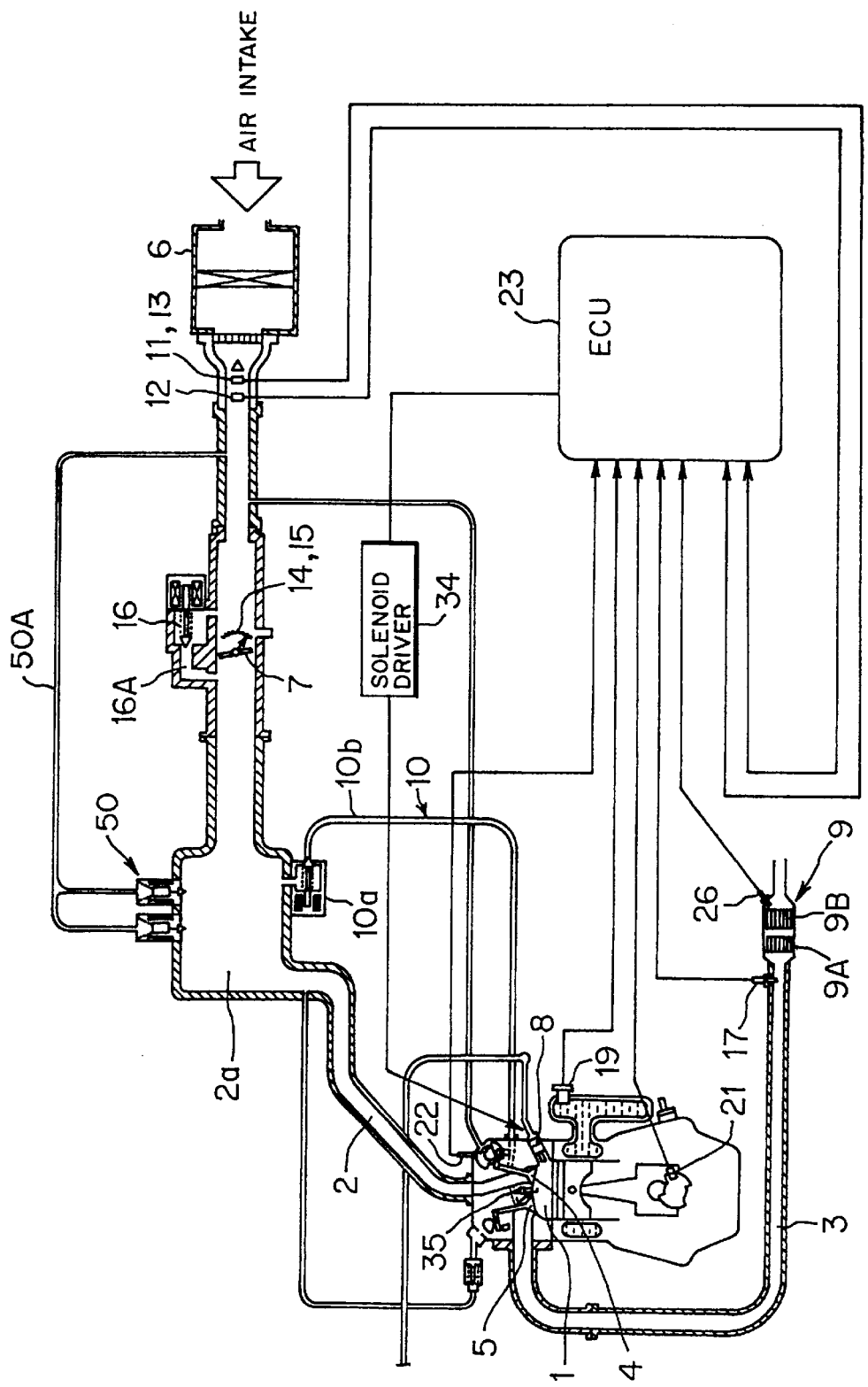
FIG. 3 is an overall construction diagram of the exhaust gas heating system according to the first embodiment of the present invention for the in-cylinder injection internal combustion engine.

The in-cylinder injection internal combustion engine equipped with the exhaust gas heating system is constructed as shown in FIG. 3. The internal combustion engine, which performs individual strokes of intake, compression, expansion and exhaust in a working cycle, namely, a four-cycle engine, is of the spark ignition type. Moreover, the internal combustion engine is constructed as an in-cylinder injection internal combustion engine in which fuel is injected directly into a combustion chamber.

As is illustrated in FIG. 3, an intake passage 2 and an exhaust passage 3 are connected to the combustion chamber, designated at numeral 1, so that the intake passage 2 and the exhaust passage 3 can be communicated to the combustion chamber 1. The intake passage 2 and the combustion chamber 1 are brought into mutual communication under control by an intake valve 4, while the exhaust passage 3 and the combustion chamber 1 are brought into mutual communication under control by an exhaust valve 5.

The intake passage 2 is provided with an air cleaner 6 and a throttle valve 7, which are arranged in this order from an upstream side of the intake passage 2. The exhaust passage 3, on the other hand, is provided with an exhaust gas purification catalytic converter 9, as an exhaust gas purification device, and an unillustrated muffler (silencer), which are arranged in this order from an upstream side of the exhaust passage 3. Incidentally, the intake passage 2 is also provided with a surge tank 2a.

Also arranged is an exhaust gas recirculation system (hereinafter called the "ERG system") 10. Described specifically, an exhaust gas recirculation passage 10b is arranged so that the intake passage 2 is connected at the surge tank 2a with an upstream side of the exhaust passage 3. This exhaust gas recirculation passage 10b is provided with an EGR valve 10a.

By the EGR valve 10a, the flow rate of exhaust gas (which may also be called "emission" or "emission gas") from the exhaust passage 3 to the intake passage 2 can be controlled. Incidentally, control of the EGR valve 10a is performed depending on operation conditions of the engine.

The throttle valve 7 varies in opening depending on a stroke of an unillustrated accelerator pedal, whereby the quantity of air to be introduced into the combustion chamber 1 is adjusted. Further, designated at numeral 16 is an idle speed control valve (ISC valve), which is arranged in a bypass line 16A disposed bypassing a throttle-valve-arranged portion of the intake passage 2, is on/off driven by an unillustrated stepper motor, and finely adjusts an idling speed primarily when the throttle valve 7 is fully or substantially closed.

Numeral 50 indicates an air bypass valve (ABV), which is arranged in a bypass line 50A communicating the intake passage 2 on an upper side of the throttle valve 7 with the surge tank 2a so that the throttle-valve-arranged portion of the intake passage 2 is bypassed. The air bypass valve 50 adjusts the air/fuel ratio by adjusting the quantity of intake air independently of the throttle valve 7.

An injector (fuel injection valve) 8, as a fuel injection device, is arranged with its nozzle facing the combustion chamber 1 so that fuel is injected directly into the combustion chamber 1 in a cylinder. Needless to say, one injector 8 is arranged per cylinder. Assuming, for example, that the engine in this embodiment is an in-series 4-cylinder engine, four injectors 8 are arranged.

Owing to the construction as described above, air, which has been inducted through the air cleaner 6 in an amount corresponding to an opening of the throttle valve 7, is inducted into the combustion chamber 1 when the intake valve 4 is opened. Within the combustion chamber 1, the thus-inducted air is mixed with fuel directly injected from the injector 8, and the resultant air-fuel mixture is ignited there at an appropriate timing by a spark plug 35. The air-fuel mixture is hence caused to burn so that an engine torque is produced. After that, the thus-burnt air-fuel mixture is discharged as exhaust gas from the combustion chamber 1 into the exhaust passage 3. After three noxious components of CO, HC and NOx in the exhaust gas are purified at the catalytic converter (which may hereinafter be called simply the "catalyst") as the exhaust gas purification device, the exhaust gas is deaden in noise and is then released to a side of the atmosphere.

In particular, this engine performs a fuel-saving operation while keeping the air/fuel ratio lean, and during a lean operation, NOx in exhaust gas cannot be fully purified if a conventional three-way catalyst is solely relied upon. Accordingly, the catalyst 9 is composed in combination of a lean NOx catalyst 9A and a three-way catalyst 9B. Namely, the three-way catalyst 9B equipped with a three-way function, which can purify CO, HC and NOx in exhaust gas at a stoichiometric air/fuel ratio, is arranged downstream of the lean NOx catalyst 9A.

The arrangement of the three-way catalyst 9B on the downstream side of the lean NOx catalyst 9A is to ensure purification of CO and HC, which the lean NOx catalyst has failed to fully purify, while avoiding any interference with the purification of NOx at the lean NOx catalyst 9A. Incidentally, the three-way catalyst 9B can be omitted when the lean NOx catalyst 9A has a three-way function.

Describing the engine in further detail, the engine is constructed so that an inducted air flow, which has flowed into the combustion chamber 1 from the intake passage 2, forms a vertical swirl (reverse tumble flow). As the inducted air flow forms such a vertical swirl within the combustion chamber 1, use of this vertical swirl makes it possible to have fuel gathered only in a vicinity of the spark plug 35 arranged, for example, centrally in a top part of the combustion chamber 1 and also to establish a state of an extremely lean air-fuel ratio in a part remote from the spark plug 35. By achieving a stoichiometric air/fuel ratio only in the vicinity of the spark plug 35 in this manner, the fuel consumption can be reduced while realizing stabilized stratified combustion. As an optimal timing of a fuel injection in this case, it is desired to inject fuel in a latter stage of a compression stroke.

To obtain a high power output from the engine, it is only necessary to form an air-fuel mixture of a stoichiometric air/fuel ratio or a lean air/fuel ratio throughout the entire combustion chamber 1 to establish premixed combustion. Here again, it is possible to efficiently obtain a high power output by conducting an injection of fuel at such a timing that atomization and vaporization of the fuel can be fully achieved. As an optimal timing for the injection of fuel in this case, it is known to set the timing such that the injection of fuel can be completed in an early stage or a former stage of an intake stroke to permit promotion of atomization and vaporization of the fuel by using an inducted air flow.

Incidentally, a variety of sensors are arranged to control the engine. First, arranged on the side of the intake passage 2 are inter alia an air flow sensor 11 for detecting the quantity of inducted air from Karman vortex information, an inducted air temperature sensor 12 for detecting the temperature of inducted air and an atmospheric pressure sensor 13 for detecting an atmospheric pressure, all at an air-cleaner-arranged portion; and a throttle opening sensor 14 of the potentiometer type for detecting an opening of the throttle valve 7 and an idling switch 15 for detecting an idling state or the like, both at the throttle-valve-arranged portion.

On the side of the exhaust passage 3, on the other hand, there are arranged on an upstream side of the catalyst 9 an oxygen concentration sensor 17 (hereinafter simply called the "$O_2$ sensor 17") for detecting an oxygen concentration ($O_2$ concentration) in exhaust gas; and on a downstream side of the catalyst 9, a catalyst temperature sensor (high temperature sensor) 26 for detecting the temperature of the catalyst or its vicinity as a purification device temperature computing unit.

Figure 2:
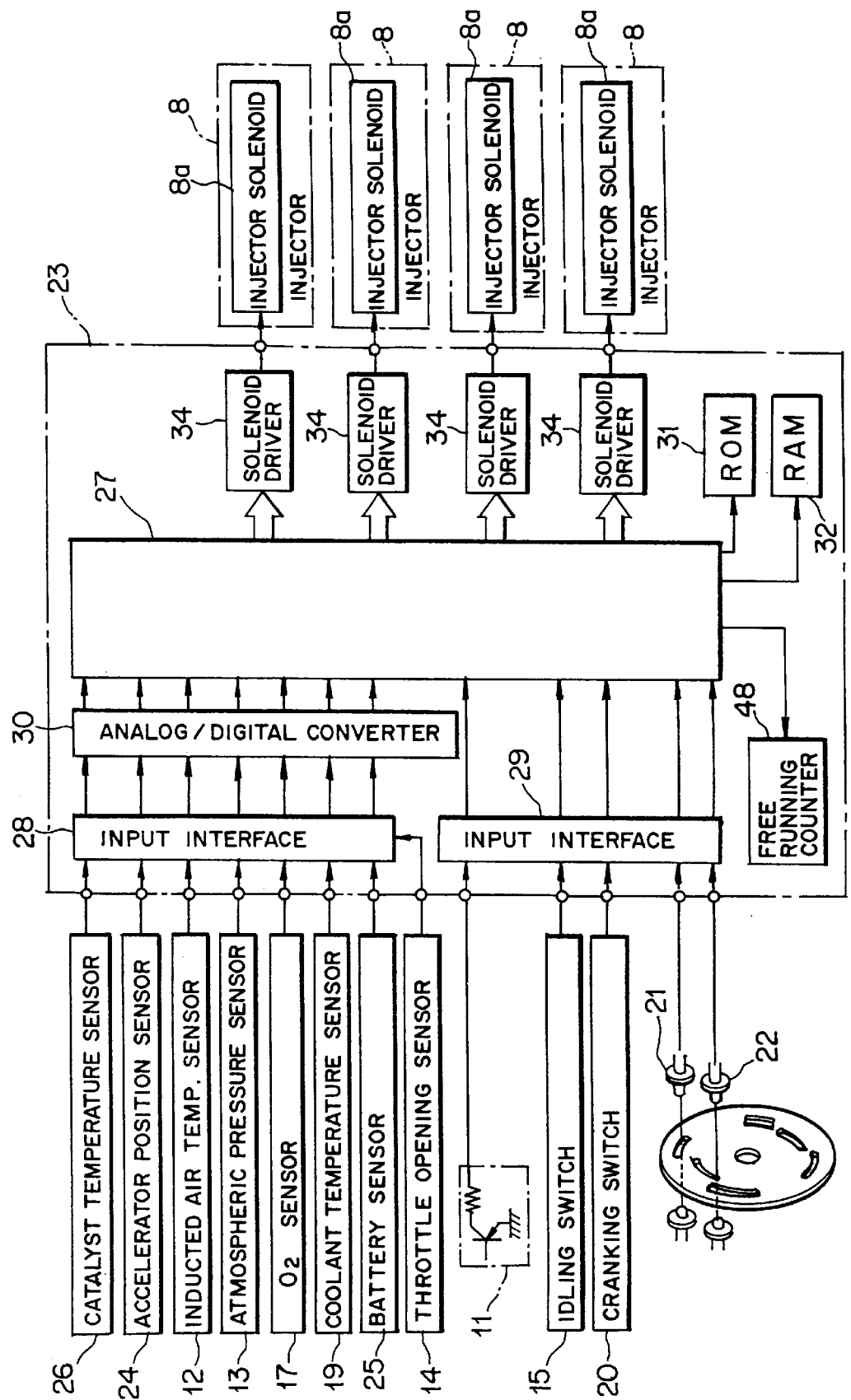
FIG. 2 is a control block diagram of the exhaust gas heating system according to the first embodiment of the present invention for the in-cylinder injection internal combustion engine.

Other sensors include a coolant temperature sensor (coolant temperature detection unit) 19 as an engine temperature detection unit for detecting the temperature of an engine coolant (engine temperature); and as is shown in FIG. 2, a crank angle sensor 21 for detecting a crank angle (this crank angle sensor 21 also serves as a rotational speed sensor for detecting an engine speed) and a TDC sensor (cylinder-identifying sensor) 22 for detecting top dead center of a first cylinder (reference cylinder), both arranged in a vicinity of a cam.

Detection signals from these sensors are inputted to an electronic control unit (ECU) 23.

Also inputted to the ECU 23 are voltage signals from an accelerator position sensor 24 for detecting a stroke of the accelerator pedal, and a battery sensor 25 for detecting the voltage of a battery, and a signal from a cranking switch [or ignition switch (key switch)] 20 for detecting a start-up.

Incidentally, the hardware construction of the ECU 23 can be illustrated as shown in FIG. 2. This ECU 23 is provided with a CPU 27 as its principal unit. To the CPU 27, detection signals are inputted through an input interface 28 and an analog/digital converter 30 from the inducted air temperature sensor 12, the atmospheric pressure sensor 13, the throttle opening sensor 14, the $O_2$ sensor 17, the coolant temperature sensor 19, the accelerator position sensor 24, the catalyst temperature sensor 26, and the battery sensor 25; and detection signals are also inputted through an input interface 29 from the air flow sensor 11, the crank angle sensor 21, the TDC sensor 22, the idling switch 15, the cranking switch 20, and an ignition switch and the like.

Through a bus, the CPU 27 also exchange data with an ROM 31 that stores program data and fixed value data, an RAM 32 that is successively rewritten by updating, a free running counter 48, and a battery backed-up RAM (not shown) that is backed up by a battery to hold stored information, data and the like as long as the battery is connected.

Incidentally, the data of the RAM 32 are erased and reset whenever an ignition switch is turned off.

Further, fuel injection control signals obtained, as a result of computation at the CPU 27, are outputted to solenoids (injector solenoids) 8a of injectors 8 via solenoid drivers (four solenoid drivers in this embodiment; fuel injection valve drive unit) 34 for the respective cylinders.

Now paying attention to fuel injection control (air/fuel ratio control), fuel injection control signals computed at the CPU 27 are outputted via the respective drivers 34 so that the injectors, for example, the four injectors 8 are successively driven.

From the above-mentioned characteristics of the in-cylinder injection engine, the engine is provided, as fuel injection modes, with a latter-stage injection mode that performs an injection of fuel in a compression stroke (especially, in a latter half of a compression stroke) to improve the gas mileage by achieving a lean operation based on stratified combustion, a former-stage injection mode that performs an injection of fuel in an intake stroke (especially, in a former half of an intake stroke) to achieve a lean operation based on premixed combustion and hence to obtain an output by a gentle acceleration, and a stoichiometric mode that performs an injection of fuel in an intake stroke to achieve a stoichiometric operation (theoretical air/fuel ratio operation) by premixed combustion and thus to improve the power output over the former-stage injection mode.

In particular, to activate the catalyst 9, the internal combustion engine is designed to inject additional fuel in an expansion stroke in addition to a fuel injection (primary fuel injection) for conventional combustion such as that described above. This additional fuel injection is to heat and activate the catalyst 9 by subjecting the additional fuel to combustion by a flame propagated from the primary combustion without energizing the spark plug again and then feeding the thus-heated exhaust gas to the catalyst 9.

Figure 4:
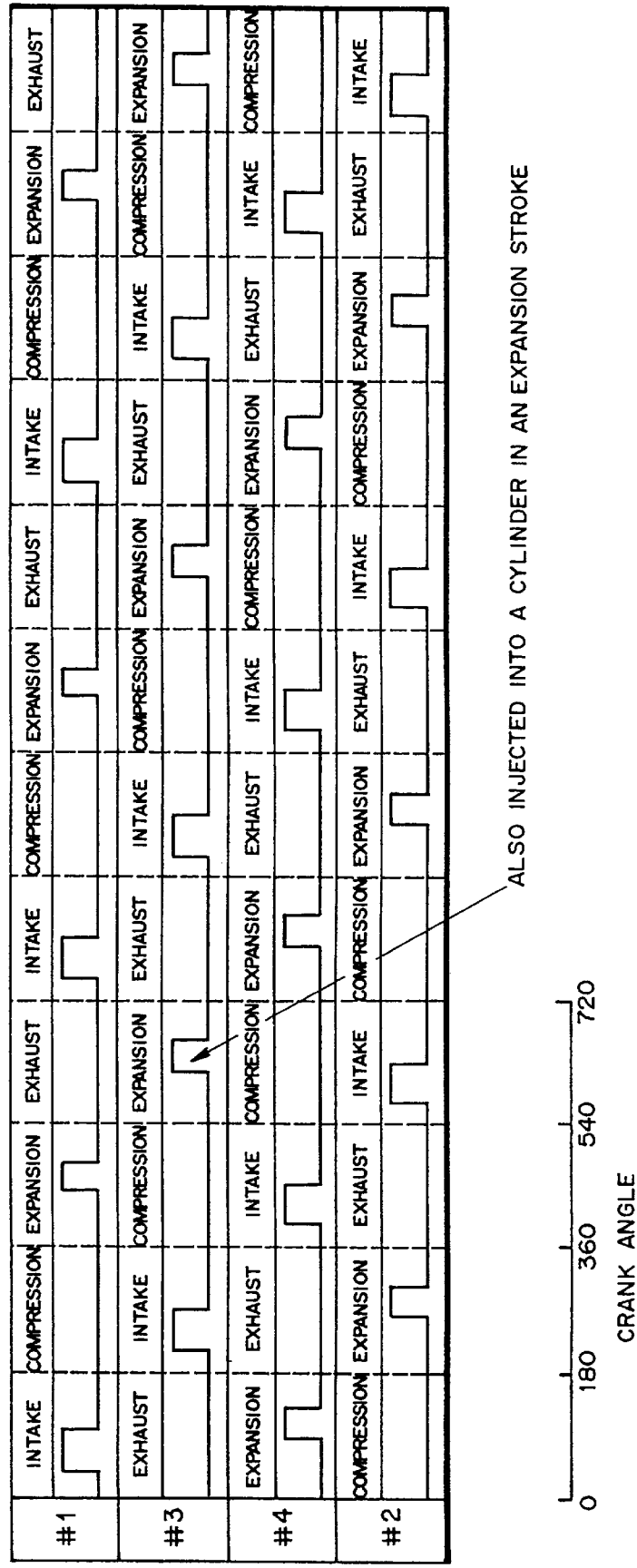
FIG. 4 is a chart showing an injection timing of additional fuel by the exhaust gas heating system according to the first embodiment of the present invention for the in-cylinder injection internal combustion engine.

This additional fuel injection is therefore designed to perform control on a basis of operation conditions of the internal combustion engine, especially, the state of activation of the catalyst 9, so that as is illustrated in FIG. 4, an injection of additional fuel is conducted in each expansion stroke (specifically, while a flame still exists in each expansion stroke) of each cylinder and is ended when the catalyst 9 is brought back into an active state.

Figure 1:
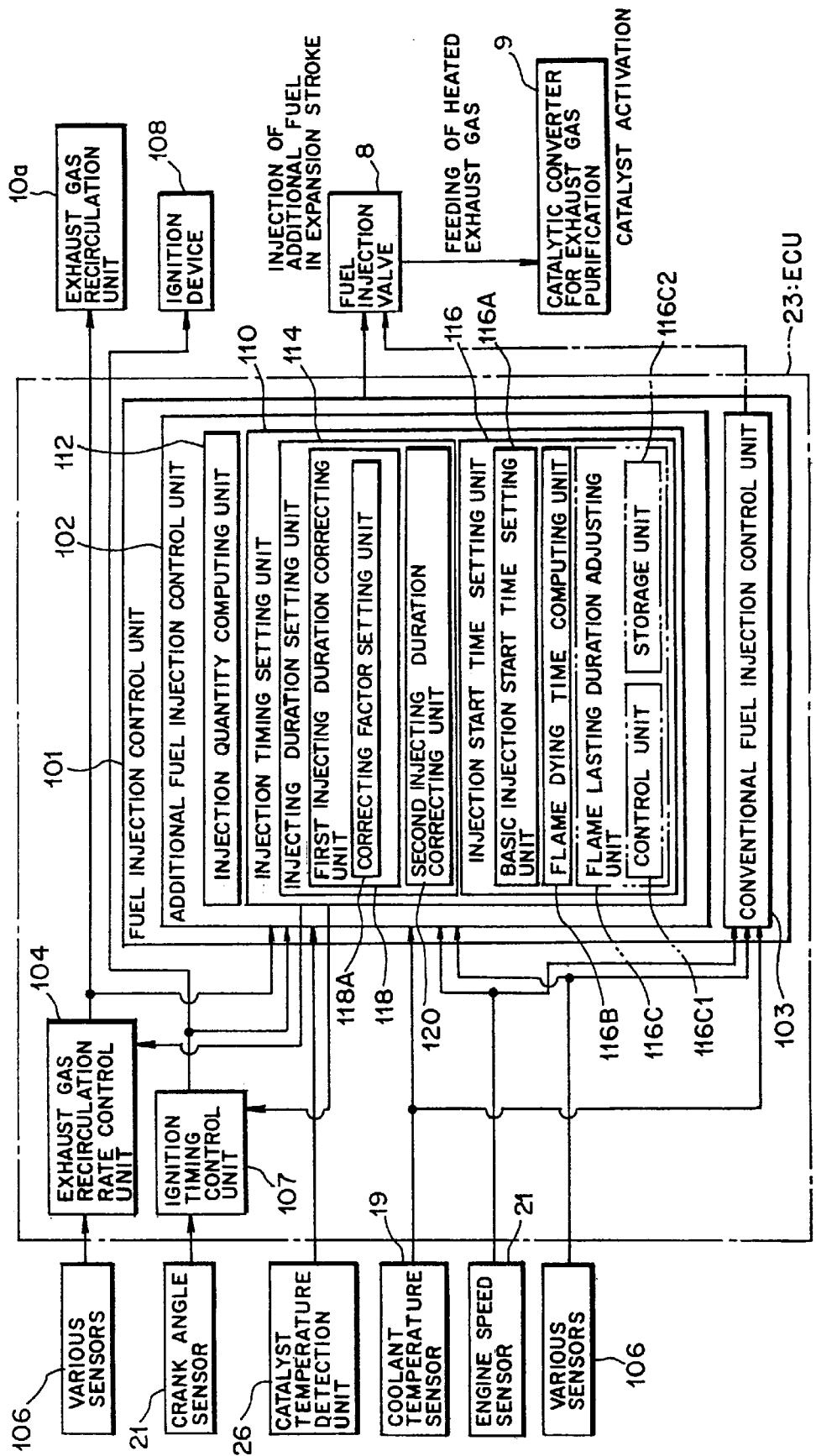
FIG. 1 is a control block diagram schematically illustrating the construction of an essential part of a control system of an exhaust gas heating system according to a first embodiment of the present invention for an in-cylinder injection internal combustion engine.

For such fuel injection control (injector drive control), the ECU 23 is provided with a fuel injection control unit 101 for performing the selection of one of the injection mode and the setting of a fuel injection quantity as shown in the functional block diagram of FIG. 1. Further, the ECU 23 is internally provided with an exhaust gas recirculation rate control unit 104 and an ignition timing control unit 107.

As depicted in FIG. 1, the fuel injection control unit 101 is provided with a function for performing an injection of additional fuel when the catalyst 9 is inactive (additional fuel injection control unit) 102 and a function for performing fuel injection control at the time of a normal operation (conventional fuel injection control unit) 103. The additional fuel injection control unit 102 is a characteristic constitutional element of the exhaust gas heating system which is concerned with purification of exhaust gas.

Based on detection information from the catalyst temperature sensor (catalyst temperature detection unit) 26 as the purification device temperature computing unit for detecting the temperature of the catalyst 9 or its vicinity, the additional fuel injection control unit 102 determines whether or not the catalyst 9 is in an active state. If the catalyst 9 is not found to be in an active state, an injection of additional fuel is performed during a flame lasting duration in which a flame of primary combustion based on the injection of the primary fuel still remains. Described specifically, when the temperature (hereinafter called the "catalyst temperature") $\theta c.c$ of the catalyst 9 or its vicinity, as detected by the catalyst temperature sensor 26, is determined or estimated to be equal to or lower than a predetermined temperature $\theta_o$, the catalyst 9 is determined to be in an inactive state. Based on this determination, control is performed such that additional fuel is injected in an expansion stroke of each cylinder (see FIG. 4).

Here, the predetermined temperature $\theta_o$ is a target catalyst activation temperature and is determined based on a lower limit temperature for catalyst activation. For example, it may be set as a value which is obtained by adding a certain predetermined temperature to the lower limit temperature for catalyst activation. This lower limit temperature for catalyst activation is approximately 400° or so for the lean NOx catalyst employed in this embodiment. Incidentally, the target temperature $\theta_o$, as the predetermined temperature (the predetermined temperature will hereinafter be called the "target temperature"), may be set to conform with a catalyst activation temperature.

The additional fuel injection control unit 102 is provided with an injection quantity computing unit 112 for determining an injection quantity of additional fuel on the basis of a quantity of oxygen still remaining after primary combustion and also with an injection timing setting unit 110 for setting the timing of an injection of the additional fuel.

Here, the injection quantity computing unit 112 directly or indirectly detects the quantity of the oxygen still remaining after the primary combustion and then determines the injection quantity of the additional fuel on the basis of the quantity of the remaining oxygen so detected.

The injection timing setting unit 110 sets an injecting duration and injection start time of additional fuel on the basis of various parameters affecting a flame lasting duration during which a flame of primary combustion remains, and has a function (injecting duration setting unit) 114 to an injecting duration of additional fuel in each cycle in accordance with the injection quantity determined by the injection quantity computing unit 112 and also a function (injection start time setting unit) 116 to set an injection start time $T_{INJ}$ for the additional fuel.

Of these units, the injection start time setting unit 116 sets an injection start time $T_{INJ}$ so that in an expansion stroke of each cylinder, an injection of additional fuel is performed in a combustion duration at the time of combustion by a conventional fuel injection (hereinafter called the "primary combustion"), in other words, in a duration in which a flame exists (hereinafter called the "flame lasting duration").

Figure 9:
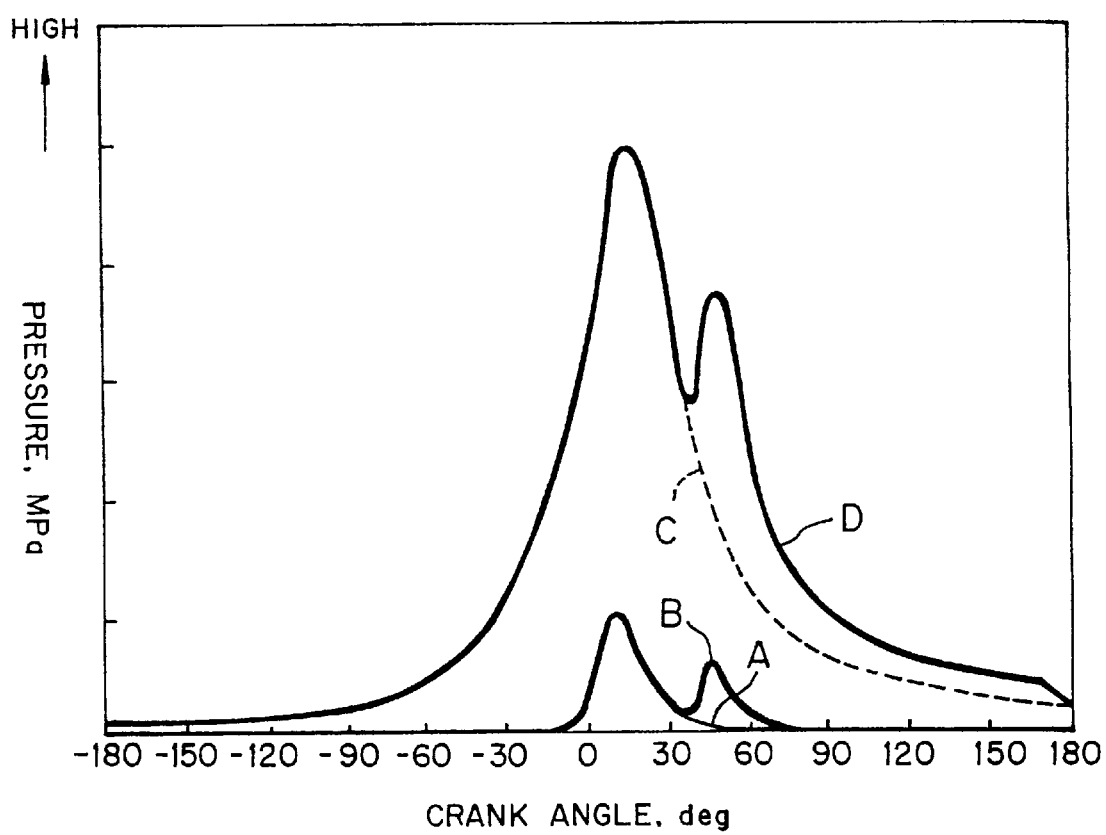
FIG. 9 is a diagram for explaining an internal cylinder pressure and a heat release rate when an injection of additional fuel is performed in an expansion stroke by the exhaust gas heating system according to the first embodiment of the present invention for the in-cylinder injection internal combustion engine.

The setting of the injection start time $T_{INJ}$ of the additional fuel as described above is to cause combustion (hereinafter called the "additional combustion") of the fuel, which is injected by the additional fuel injection, without arrangement of any additional device, because it is necessary to perform the additional fuel injection in the flame lasting duration of fuel by a conventional fuel injection as is illustrated in FIG. 9.

Because, gasoline, which is used as fuel, has low self-ignition property, and hence has a property that cannot undergo reliable combustion unless a combustible source or an external energy source for inducing chemical decomposition of gasoline itself to cause combustion of gasoline is present. In contrast, fuels having high self-ignition property include those having high setane numbers such as diesel oil.

FIG. 9 diagrammatically illustrates internal cylinder pressures and heat release rates from a compression stroke to a combustion and expansion stroke. In FIG. 9, a thin curve A indicates heat release rates when only conventional fuel injections were performed, a thick curve B designates heat release rates when additional fuel injections were performed, a broken curve C represents internal cylinder pressures when only conventional fuel injections were performed, and a thick curve D shows internal cylinder pressures when additional fuel injections were performed. Incidentally, the durations indicated as heat release rates by the thin curve A and the thick curve B are equivalent to flame lasting durations.

As shown in FIG. 9, when an additional fuel injection is performed at a time as late as possible within a flame lasting duration of primary combustion corresponding to a heat release rate indicated by the thin curve A, the flame lasting duration is extended close to an exhaust stroke as indicated by the thick curve B. Thermal energy, which is obtained as a result of heating of exhaust gas by the additional combustion, can therefore be used more effectively for heating the catalyst 9A.

On the other hand, the thick curve D indicates that the internal cylinder pressure rises when an additional fuel injection is performed. When the internal cylinder pressure rises as described above, the thermal energy obtained by the additional combustion is considered to be used in a greater proportion for the work that depresses the piston (gas expansion work). Such a rise in internal cylinder pressure is therefore not preferred for heating exhaust gas.

To effectively use the thermal energy obtained by the additional combustion, it is therefore desired to set the injection start time $T_{INJ}$ of additional fuel at a time as late as possible within an expansion stroke. On the other hand, the injection start time $T_{INJ}$ of the additional fuel must fall within the flame lasting duration as mentioned above. It is therefore desired to set the injection start time $T_{INJ}$ of the additional fuel at a time as late as possible within the flame lasting duration (i.e., at a time close to a flame dying time).

A flame dying time, which is an ending time of a flame lasting duration, varies under influence of various parameters such as the coolant temperature (engine temperature) $\theta w$, the exhaust gas recirculation rate at the time of primary combustion (EGR rate), the air/fuel ratio (A/F) at the time of primary combustion, and the ignition timing $T_{IG}$ at the time of primary combustion. It is therefore necessary to take influence of these parameters into consideration upon setting an injection start time $T_{INJ}$ for additional fuel.

Taking into consideration the coolant temperature $\theta w$ alone, for example, a low coolant temperature $\theta w$ leads to a deterioration in combustion and hence to an advance in flame dying time. In order to assure additional combustion, it is therefore desired to advance the injection start time $T_{INJ}$ (to an initial stage of an expansion stroke) as the coolant temperature $\theta w$ becomes lower. Because, a cylinder block and its peripheral components are cool when an engine is cool. Accordingly, heat tends to dissipate through the cylinder block and the like. Moreover, a flame is brought into contact with an inner wall of the cylinder block over a wide area so that a large quenching zone is formed. Even if a flame of primary combustion begins to propagate, the flame therefore dies before it spreads throughout the combustion chamber.

Next taking the EGR rate alone into consideration, a large EGR rate results in a greater ignition lag upon primary combustion so that the maximum pressure within the combustion chamber and the crank angle corresponding to the maximum pressure vary from cycle to cycle. These variations become greater with the EGR rate. The flame lasting duration also varies in association with these variations. In order to assure combustion of additional fuel, it is therefore preferred to advance the injection start time $T_{INJ}$ of the additional fuel within an expansion stroke.

Further, A/F alone will now be considered. Similarly to the case where the EGR alone was considered, the ignition lag in primary combustion increases as the air/fuel ratio becomes leaner, whereby the maximum pressure within the combustion chamber and the crank angle corresponding to the maximum pressure vary from cycle to cycle. These variations increase as the air/fuel ratio becomes leaner. The flame lasting duration also varies in association with these variations. In order to assure combustion of additional fuel, it is therefore preferred to advance the injection start time $T_{INJ}$ of the additional fuel within an expansion stroke.

Taking into consideration only the primary-combustion-time ignition timing $T_{IG}$, the flame lasting duration, that is, the flame dying time varies when the ignition timing $T_{IG}$ is advanced or retarded. It is therefore preferred to set the injection start time $T_{INJ}$ of additional fuel in accordance with an advance or retard in the ignition timing $T_{IG}$. Because, when the ignition timing $T_{IG}$ is advanced, the combustion duration becomes shorter and the flame dying time becomes earlier. When the ignition timing $T_{IG}$ is conversely retarded, the combustion becomes slow (the combustion velocity becomes slow) so that the flame dying time becomes later.

As is appreciated from the foregoing, it is necessary to set the injection start time $T_{INJ}$ of additional fuel in view of the flame lasting duration of the primary combustion. The setting of the injection start time $T_{INJ}$ in an expansion stroke by the injection start time setting unit 116 is therefore conducted by correcting the basic fuel injection start time $Tb_{INJ}$, which serves as a basis in the injection of additional fuel in the expansion stroke, with various correction factors in view of parameters affecting the flame lasting duration in which the flame of the primary combustion remains, that is, the coolant temperature $\theta w$, the primary-combustion-time EGR rate, the primary-combustion-time air/fuel ratio, and the flame dying time corresponding to the ignition timing $T_{IG}$ of the primary combustion.

The injection start time setting unit 116 is therefore provided with a function (basic injection start time setting unit 116A) to set a basic fuel injection start time and a function (flame dying time computing unit 116B) to set an injection start time correction factor in view of a flame dying time which varies under the influence of various parameters. The injection start time setting unit 116 corrects the basic injection start time, which has been set by the basic injection start time setting unit 116A, by the injection start time correction factor set by the flame dying time computing unit 116B, whereby the injection start time $T_{INJ}$ for the additional fuel is set to inject the additional fuel at a timing where the additional fuel can be ignited by the flame of the primary combustion.

Incidentally, the basic injection start time setting unit 116A determines a basic fuel injection start time $Tb_{INJ}$ from a pre-stored map $[Tb_{INJ}=f(Pe,Ne)]$ on the basis of an engine speed Ne detected by the engine speed sensor 21 and a target load value (engine load) Pe.

Here, the target load value Pe is calculated in accordance with the following formula:

$$Pe=T/(K \times Vs)$$

where T is a torque, K is a constant, and Vs is a displacement.

On the other hand, the flame dying time computing unit 116B determines an injection start time correction factor, which is set while taking into consideration a flame dying time, i.e., an ending time of a flame lasting duration, on the basis of parameters affecting the flame lasting duration. Taking into consideration a flame dying time corresponding to various parameters such as a coolant temperature $\theta w$, an ERG rate, an air/fuel ratio (A/F), a primary-combustion-time ignition timing $T_{IG}$ and the like, an injection start time correction factor corresponding to the various parameters is determined from plural maps which indicate preset injection start time correction factors.

FIGS. 6(A) through 6(D) show maps, which indicate injection start time correction factors corresponding to various parameters, respectively.

Figure 6A:
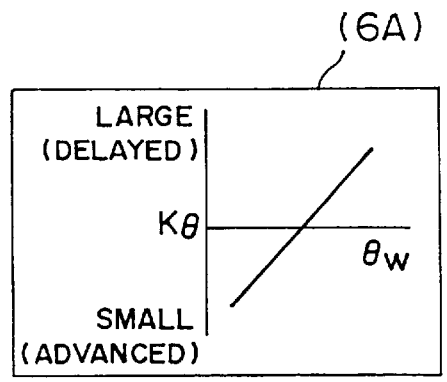

Of these, FIG. 6(A) illustrates a first injection start time correction map (6A), which indicates a coolant temperature correction factor (first injection start time correction factor)

Kθ. This coolant temperature correction factor Kθ has taken into consideration the flame dying time which becomes earlier as the coolant temperature θw drops. Since the flame dying time becomes earlier as the coolant temperature θw detected by the coolant temperature sensor 19 drops, this first injection start time correction factor Kθ is set at a smaller value as the coolant temperature θw drops, so that the injection start time $T_{INJ}$ is be advanced as the coolant temperature θw drops.

Figure 6B:
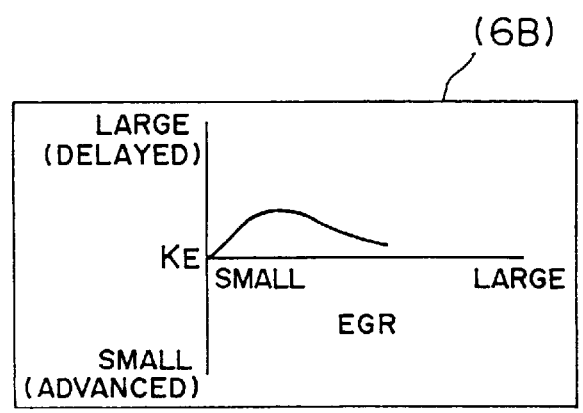

FIG. 6(B) depicts a second injection start time correction map (6B), which indicates an exhaust gas recirculation rate correction factor (second injection start time correction factor) $K_E$. The exhaust gas recirculation rate correction factor $K_E$ has taken into consideration the flame dying time which becomes later as the exhaust gas recirculation rate at the time of primary combustion decreases. Corresponding to the main-combustion-time exhaust gas recirculation rate set by the exhaust gas recirculation rate control unit 104, the state of combustion varies and the flame dying time also varies. The second injection start time correction factor $K_E$ is therefore set so that the injection start time $T_{INJ}$ varies to remain conforming with the thus-varied flame dying time.

Figure 6C:
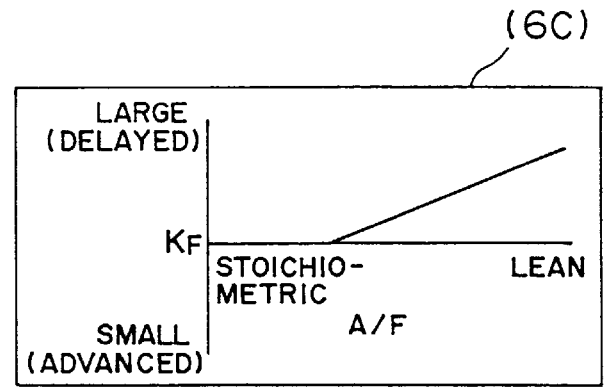

FIG. 6(C) shows a third injection start time correction map (6C), which indicates an air/fuel ratio correction factor (third injection start time correction factor) $K_F$. This air/fuel ratio correction factor $K_F$ has taken into consideration the flame dying time which delays as the main-combustion-time air/fuel ratio (A/F) becomes leaner. Since the flame dying time becomes later as the main-combustion-time air/fuel ratio set by the conventional fuel injection control unit 103 becomes leaner, the third injection start time correction factor $K_F$ is set at a greater value as the main-combustion-time air/fuel ratio becomes leaner, so that the injection start time $T_{INJ}$ is delayed as the main-combustion-time air/fuel ratio becomes leaner.

Figure 6D:
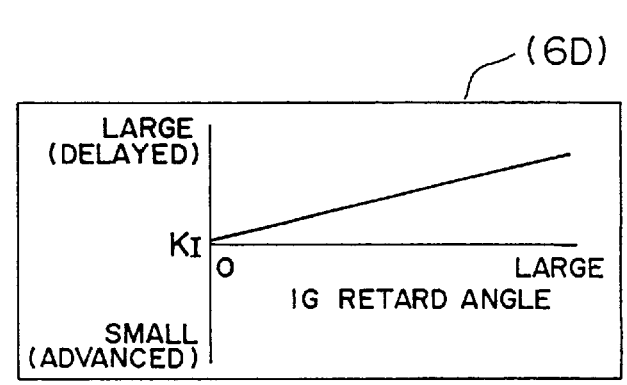

FIG. 6(D) presents a fourth injection start time correction map (6D), which indicates an ignition timing correction factor (fourth injection start time correction factor) $K_I$. This ignition timing correction factor $K_I$ has taken into consideration the flame dying time which corresponds to the main-combustion-time ignition timing $T_{IG}$. Since the flame dying time delays as the main-combustion-time ignition timing set by the ignition timing control unit 107 is retarded, the fourth injection start time correction factor $K_I$ is set at a greater value as the main-combustion-time ignition timing is retarded, so that the injection start time $T_{IG}$ is delayed as the main-combustion-time ignition timing is retarded.

To perform a correction by a coolant temperature θw, the injection start time setting unit 116 determines an injection start time $T_{INJ}$ for additional fuel by adding a coolant correction factor Kθ, which has been obtained from the map (6A) of FIG. 6(A) stored in the flame dying time computing unit 116B on the basis of a coolant temperature θw detected by the coolant temperature sensor 19, to a basic fuel injection start time $Tb_{INJ}$ determined by the basic injection start time setting unit 116A ($Tb_{INJ}$+Kθ).

To perform a correction by an exhaust gas recirculation rate, an exhaust gas recirculation rate correction factor $K_E$ is obtained from the map (6B) of FIG. 6(B) stored in the flame dying time computing unit 116B on the basis of a main-combustion-time exhaust gas recirculation rate set by the exhaust gas recirculation rate control unit 104. This correction amount is then added to a basic fuel injection start time $Tb_{INJ}$ determined by the basic injection start time setting unit 116A ($Tb_{INJ}$+$K_E$), whereby an injection start time $T_{INJ}$ for additional fuel is obtained.

To perform a correction by an air/fuel ratio, an air/fuel ratio factor $K_F$ is obtained from the map (6C) of FIG. 6(C) stored in the flame dying time computing unit 116B on the basis of a main-combustion-time air/fuel ratio set by the conventional combustion injection control unit 103. This correction amount is then added to a basic fuel injection start time $Tb_{INJ}$ determined by the basic injection start time setting unit 116A ($Tb_{INJ}$+$K_F$), whereby an injection start time $T_{INJ}$ for additional fuel is determined.

It is, however, unnecessary to perform all of the corrections which rely, as various parameters affecting the flame lasting duration, upon the engine temperature, the exhaust gas recirculation rate, the air/fuel ratio and the main-combustion-time ignition timing, respectively. It is sufficient to perform one or more of the corrections as needed in accordance with the corresponding one or ones of the parameters. It may therefore be sufficient to obtain, for example, at least one injection start time correction factor on the basis of the corresponding one of the parameters.

An injection duration (injection duration in a single working cycle) $t_{ex}$ for the additional fuel at this time is set at the injection duration setting unit 114.

This injection duration setting unit 114 sets an injector driving duration $t_{PLUS}$ (which is equivalent to the injection duration) so that the additional fuel is injected in a fuel quantity $M_{fuel}$ corresponding to surplus oxygen still remaining in the cylinder after the primary combustion.

This is to fully use the surplus oxygen, which still remains in the cylinder, by the additional fuel upon combustion of the additional fuel so that exhaust gas can be efficiently heated.

Specifically, the setting of the injector driving duration $t_{PLUS}$ in an expansion stroke by the injection duration setting unit 114 is performed as will be described hereinafter.

Namely, the setting of the injector driving duration $t_{PLUS}$ in the expansion stroke by the injection duration setting unit 114 is performed by correcting a basic driving duration $t_B$, which is equivalent to a basic injection duration and serves as a basis in the injection of the additional fuel in the expansion stroke, in accordance with an injection start time $T_{INJ}$ and a catalyst temperature θc.c.

The injection duration setting unit 114 is therefore provided with a function (first injection duration correcting unit 118) to determine the basic driving duration $t_B$, which serves as a basis in the injection of the additional fuel in the expansion stroke, and correcting the basic driving duration $t_B$ by the catalyst temperature θc.c and also with a function (second injection duration correcting unit 120) to correct the basic driving duration $t_B$ by the injection start time $T_{INJ}$ in the expansion stroke.

Here, the injection duration setting unit 114 calculates the basic driving duration $t_B$ on the basis of a fuel quantity $M_{fuel}$ which can be injected for the surplus oxygen in the cylinder after the primary combustion. Specifically, the injection duration setting unit 114 determines the quantity of oxygen, which still remains in the cylinder after the primary combustion, from an inducted air quantity Q per cylinder and per cycle as determined by the below-described conventional fuel injection control unit 103 and a target air/fuel ratio (target A/F), and then calculates the fuel quantity $M_{fuel}$ on the basis of the quantity of oxygen.

Incidentally, a fuel quantity $M_{fuel}$ is determined by the following formula:

$$M_{fuel}=Q\times(1/\text{stoichiometric air-to-fuel ratio}-1/\text{target air-to-fuel ratio})$$

On the other hand, the first injection duration correcting unit 118 corrects the basic injection duration $t_B$ in accordance with the catalyst temperature θc.c determined by the catalyst temperature sensor 26 as a catalyst temperature computing unit. The first injection duration correcting unit 118 is therefore provided with a correcting factor setting unit 118A for correcting the basic injection duration $t_B$ by a correction factor (first injection duration correcting factor) $K_2$, which has been determined beforehand in accordance with the catalyst temperature θc.c, so that the injection quantity of additional fuel becomes smaller as the catalyst temperature θc.c rises.

This correcting factor setting unit 118A is provided with a map (17B), which indicates the first injection duration correcting factor $K_2$ determined beforehand in accordance with the catalyst temperature θc.c. The first injection duration correcting factor $K_2$ shown in the map (17B) is set such that, as is illustrated in FIG. 17(B), the injection quantity of additional fuel becomes smaller as the catalyst temperature θc.c rises. Namely, in the map (17B), the first injection duration correcting factor $K_2$ is set at 1 to avoid correction of the basic driving duration $t_B$ when the catalyst temperature θc.c is low, and is set to gradually decrease to 0 when the catalyst temperature θc.c rises and approaches the target temperature θo.

This setting is to promote the activation of the catalyst 9 by injecting additional fuel in a greater quantity as the catalyst temperature θc.c becomes lower because the catalyst 9 requires more activation as the catalyst temperature θc.c becomes lower; and in contrast, to decrease the injection quantity of additional fuel to avoid an injection of unnecessary fuel as the catalyst temperature θc.c becomes higher because the catalyst 9 requires less activation as the catalyst temperature θc.c becomes higher.

The correction by the catalyst temperature θc.c at the injection duration correcting unit 118A is performed by obtaining the correction factor $K_2$ from the map (17B) on the basis of the catalyst temperature θc.c and then multiplying the basic driving duration $t_B$ With the correction factor $K_2$ ($t_B \times K_2$).

The second injection duration correcting unit 120 is to correct the basic injection duration $t_B$ in accordance with the injection start time $T_{INJ}$ in the expansion stroke so that the injection quantity determined by the injection quantity computing unit 112 conforms with an actual injection quantity. This second injection duration correcting unit 120 is provided with a map (17A), which indicates a correction factor (second injection duration correcting factor) $K_1$ determined beforehand in accordance with the injection start time $T_{INJ}$.

Figure 17A:
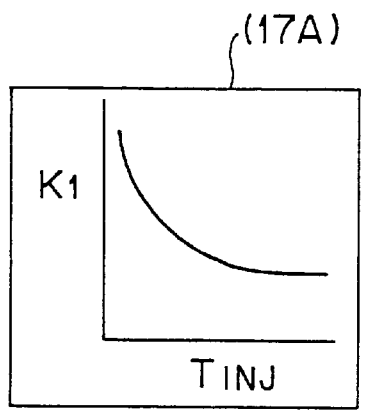
Figure 17B:
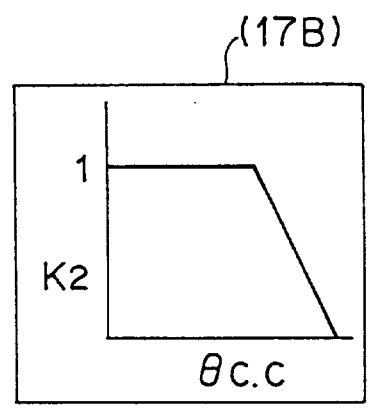

In order to bring the injection quantity determined by the injection quantity computing unit 112 into conformity with the actual injection quantity, the second injection duration correcting factor $K_1$ is set such that, as is appreciated from FIG. 17(A), the injector driving duration $t_{PLUS}$ becomes longer as the injection start time $T_{INJ}$ becomes earlier. Namely, when the injection start time $T_{INJ}$ becomes earlier in an expansion stroke, the internal cylinder pressure increases so that the quantity of fuel injected from the injector (the quantity per unit time) tends to decrease. The second injection duration correcting factor $K_1$ is therefore set so that the injector driving duration $t_{PLUS}$ becomes longer as the internal cylinder pressure becomes higher.

This setting has been chosen for the reasons to be mentioned next. When the internal cylinder pressure is low, there is a sufficient pressure difference between the internal cylinder pressure and an injection pressure so that an appropriate fuel quantity $M_{fuel}$ can be assured based on a basic driving duration $t_B$. When the internal cylinder pressure rises, however, the pressure difference between the internal cylinder pressure and an injection pressure becomes smaller, leading to a decrease in the injection quantity. In this case, an appropriate injection quantity $M_{fuel}$ cannot be assured if fuel is simply injected on the basis of the basic driving duration $t_B$. As the quantity of additional fuel to be injected in an expansion stroke is affected by an internal cylinder pressure, the setting of the injector driving duration $t_{PLUS}$ is important.

The correction by the injection start time $T_{INJ}$ at the second injection duration correction unit 120 is performed by obtaining the correction factor $K_1$ from the map (17A) on the basis of the injection start time $T_{INJ}$ and then multiplying the basic driving duration $t_B$ with the correction factor $K_1$ ($t_B \times K_1$).

Accordingly, an injector driving duration $t_{PLUS}$ in an expansion stroke is determined by the following formula:

$$t_{PLUS} = t_B \times K_1 \times K_2$$

In accordance with the injection start time $T_{INJ}$ and the injector driving duration $t_{PLUS}$ set as described above, the additional fuel injection is performed in an expansion stroke independently from the conventional fuel injection as shown in FIG. 4.

A description will now be made of the fuel injection control at the conventional fuel injection control unit 103. At this conventional fuel injection control unit 103, a target output torque T of the engine is set based on an engine speed (rotational speed) Ne and an accelerator pedal stroke $θ_{ACC}$ detected from the engine speed sensor 21 and various sensors 106, and either an early injection mode or a late injection mode is selected as an injection mode in accordance with the engine speed Ne and the target output torque T. For example, the late injection mode is selected in a range where the engine speed Ne is low and the target output torque T is also low, and the early injection mode (the stoichiometric mode or the lean mode) is selected unless either the engine speed Ne or the target output torque is low.

A fuel injection quantity is set as a fuel injecting duration $T_{AU}$, which is an injector-driving duration and will be called an "injector driving pulse width" in actual control. In both the early injection mode (the stoichiometric mode) and the late injection mode, a basic driving duration $t_B$ is first calculated by the following formula on the basis of an engine load (inducted air quantity per stroke) Q/Ne and a target air/fuel ratio (A/F, hereinafter abbreviated as "A/F").

$$t_B = (Q/Ne) \times (1/AF) \times (α_{AIR}/α_{FUEL}) \times (1/G_{INJ})$$

In this formula, the engine load Q/Ne is the quantity of air inducted in a stroke, and is determined by dividing an inducted air quantity Q detected at the air flow sensor 11 with an engine speed Ne detected at the engine speed sensor (crank angle sensor) 21.

On the other hand, $α_{AIR}$ represents an air density, $α_{FUEL}$ is a fuel density, and $G_{INJ}$ stands for an injector gain.

Accordingly, a fuel injecting duration $t_{AU}$ is calculated by the following formula.

$$t_{AU} = t_B \times f + t_D$$

In this formula, f represents various fuel correction factors. These fuel correction factors f are set in accordance with an engine coolant temperature detected by the coolant sensor 19, an inducted air temperature detected by the inducted air temperature sensor 12, an atmospheric pressure detected by the atmospheric pressure sensor 13, and the like, respectively. Further, $t_D$ is an injector insensitive duration (dead time).

Describing next about the exhaust gas recirculation rate control unit 104, the exhaust gas recirculation rate control unit 104 controls the EGR valve (on/off valve) 10a, as an exhaust gas recirculation unit, on the basis of detection information from various sensors 106. For this purpose, a signal from the exhaust gas recirculation rate control unit 104 is sent to the additional fuel injection control unit 102 of the fuel injection control unit 101.

In addition to this regular function, the exhaust gas recirculation range control unit 104, in this embodiment, has another function that controls the EGR valve 10a to decrease the exhaust gas recirculation rate or to reduce it to zero when an injection of additional fuel is performed in a flame lasting duration of an expansion stroke to heat exhaust gas for the activation of the catalyst 9. For this additional purpose, a signal from the injection timing setting unit 110 of the additional fuel injection control unit 102 is sent to the exhaust gas recirculation rate control unit 104.

Further, the ignition timing control unit 107 controls an ignition timing $T_{IG}$ by the spark plug 35, as an ignition device 108, on the basis of detection information from the crank angle sensor 21. For this purpose, a signal from the ignition timing control unit 107 is sent to the additional fuel injection control unit 102 of the fuel injection control unit 101.

In addition to this regular function, the ignition timing control unit 107 in this embodiment has another function that retards the ignition timing $T_{IG}$ of primary combustion when an injection of additional fuel is performed in a flame lasting duration of an expansion stroke to heat exhaust gas for the activation of the catalyst 9. For this additional purpose, a signal from the injection timing setting unit 110 of the additional fuel injection control unit 102 is sent to the ignition timing control unit 107.

Figure 5A:
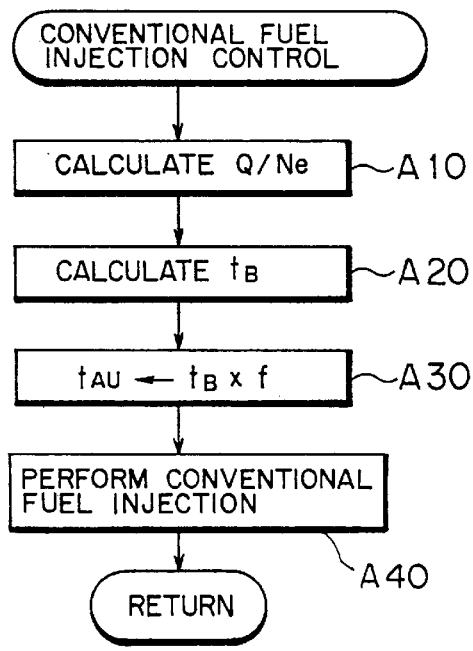
Figure 5B:
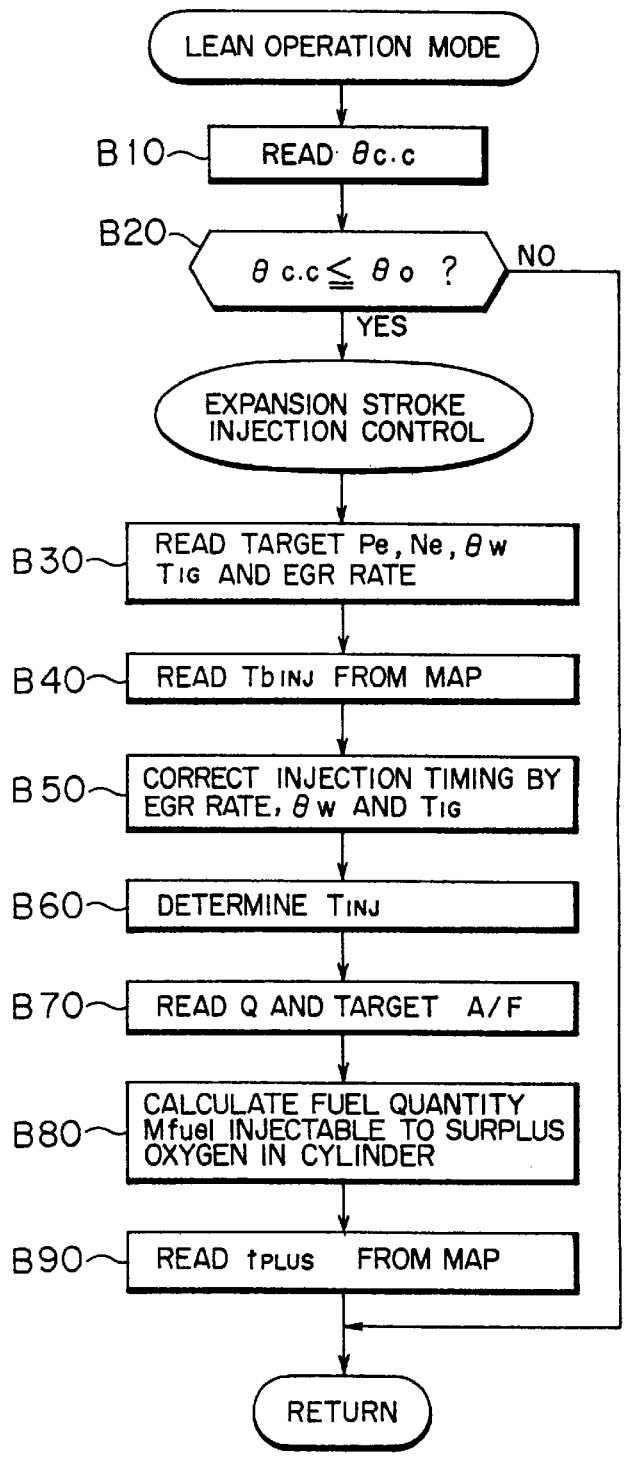

As the exhaust gas heating system according to the first embodiment of the present invention for the in-cylinder injection internal combustion engine is constructed as described above, the control of a conventional fuel injection is performed, for example, as illustrated in FIG. 5(A), and the control of an additional fuel injection (the expansion-stroke fuel injection control) is carried out, for example, as shown in FIG. 5(B).

A description will first be made about the conventional fuel injection control.

This control is performed at predetermined crank angles. First, the processings of steps A10 to A30 are performed. Specifically, in step A10, an engine load Q/Ne (namely, a quantity of air inducted in a stroke) is calculated from an inducted air quantity Q and an engine speed Ne which have been detected by the air flow sensor 11 and the speed sensor 21, respectively. In step A20, a basic driving duration $t_B$ is then calculated based on the engine load Q/Ne as indicated by the above formula. Further, in step A30, the basic driving duration $t_B$ is subjected to multiplication by various fuel correction factors f and also to like processing to calculate a fuel injecting duration $t_{AU}$.

Based on the fuel injecting duration $t_{AU}$, a conventional fuel injection is then performed (step A40).

Describing next about the expansion stroke fuel injection control (additional fuel injection control), this expansion stroke fuel injection-control is performed when the lean operation mode is selected under the early injection mode or the late injection mode. FIG. 5(B) shows the control to be performed when an expansion stroke fuel injection is conducted in the early injection mode.

First, the processings of steps B10 and B20 are performed. Namely, a catalyst temperature θc.c is read in step B10. It is then determined in step B20 whether or not the catalyst temperature θc.c is not higher than a target temperature θo.

If the catalyst temperature θc.c is found to be equal to or lower than the target temperature θo as a result of the above determination, the processings of steps B30 to B90 are performed to conduct the expansion stroke fuel injection control. If the catalyst temperature θc.c is higher than the target temperature θo, the routine returns without performing the expansion stroke fuel injection control.

In the expansion stroke fuel injection control, the processings of steps B30 to B60 are first performed to set an injection start time $T_{INJ}$ for an expansion stroke.

Described specifically, a target load (target Pe), an engine speed Ne, a coolant temperature θw, an ignition timing $T_{IG}$ for primary combustion and an EGR rate are read in step B30. In step B40, based on the engine speed Ne and the target load Pe, a basic injection start time $Tb_{INJ}$ for the expansion stroke is next read from the prestored map. In step B50, the basic injection start time $Tb_{INJ}$ is corrected by the EGR rate, the coolant temperature θw and the ignition timing $T_{IG}$ of the primary combustion and, in step B60, the expansion-stroke injection start time $T_{INJ}$ is set.

The processings of steps B70 to B90 are then performed to set an injector driving duration $t_{PLUS}$ for the expansion stroke.

Described specifically, an inducted air quantity Q per stroke and a target A/F are read in step B70. Next, in step B80, the quantity of oxygen still remaining in the cylinder after the primary combustion is determined from the inducted air quantity Q per cylinder and per cycle and based on the oxygen quantity, a fuel quantity $M_{fuel}$ is calculated. Further, in step B90, the basic driving duration $t_B$ for the injection of additional fuel in the expansion stroke is corrected by the injection start time $T_{INJ}$ and the catalyst temperature θc.c and based on this setting, the additional fuel injection is performed in the expansion stroke.

According to the exhaust gas heating system of this embodiment for the in-cylinder injection internal combustion engine, additional fuel is injected in a duration where a flame of primary combustion still remains (i.e., in a flame lasting duration) as described above. Without needing arrangement of any specific additional device, the combustion of the additional fuel is therefore assured so that exhaust gas can be heated reliably. There is, accordingly, an advantage that the catalyst temperature θc.c can be promptly brought to the target temperature θo.

As it is not necessary to arrange any additional device, the time until activation of the catalyst 9 can be shortened, leading to a further advantage that the contents of noxious components (HC, CO, NOx) in exhaust gas can be reduced.

Further, the injection start time $T_{INJ}$ of the additional fuel is set to fall within the flame lasting duration which varies in accordance with various parameters. The combustion of the additional fuel is therefore assured so that exhaust gas can be heated reliably. This also leads to the advantage that the catalyst temperature θc.c can be promptly brought to the target temperature θo.

There is a further advantage that even at the lean NOx catalyst 9A, the catalyst temperature can be reliably heated and the target temperature θo can be reached quickly.

From the standpoint of promoting the heating of the catalyst 9, it is desired to arrange the lean NOx catalyst 9A in the vicinity of the engine (i.e., on an extremely upstream side of the exhaust passage 3). This is however not feasible because the lean NOx catalyst 9A is lower in heat resistance than the threeway catalyst 9B. The exhaust gas heating system of the first embodiment has the advantage that exhaust gas of a temperature high enough for the activation of the catalyst 9 can be obtained despite the arrangement of the catalyst 9 at the position remote from the engine.

As has been mentioned above, the first embodiment sets an injection start time $T_{INJ}$ at an optimal timing (for example, a timing close to a flame dying time) in accordance with various parameters while taking into consideration the flame dying time of a flame lasting duration. Conversely, it is also possible to set an injection start time $T_{INJ}$ at a predetermined fixed timing and to change various parameters so that a flame dying time is set at an optimal timing relative to the injection start time $T_{INJ}$.

This modification will hereinafter be described as a first modification of the first embodiment.

An injection start time setting unit 116, according to the first modification, is provided with the basic injection start time setting unit 116A and the flame dying time computing unit 116B as in the above-described first embodiment. In addition, the injection start time setting unit 116 is also provided with a function (flame lasting duration adjusting unit 116C) to perform an adjustment in a flame lasting duration of primary combustion, that is, to perform an adjustment in a flame dying time as an ending time of the flame lasting duration. By the flame lasting duration adjusting unit 116C, it is possible to positively adjust the exhaust gas recirculation rate, the air/fuel ratio and the ignition timing of primary combustion as parameters affecting the flame lasting duration of primary combustion.

For this purpose, the flame lasting duration adjusting unit 116C is provided with a control unit 116C1 for adjusting control amounts for the exhaust gas flow rate, air/fuel ratio and ignition timing as parameters affecting the flame lasting duration of primary combustion and also with a storage unit 116C2 for storing flame lasting durations corresponding to the control amounts for the individual parameters. The flame lasting duration adjusting unit 116C reads from the storage unit 116C2 control amounts associated with the individual parameters, said control amounts being required to set a flame lasting duration corresponding to a degree of the need for the activation of the catalyst 9, and then adjusts the individual parameters by the control unit 116C1 to achieve the control amounts so that the flame lasting duration is adjusted.

The storage unit 116C2 is provided with plural maps which indicate the flame lasting durations corresponding to the control amounts associated with the exhaust gas flow rate, air/fuel ratio and ignition timing as the parameters affecting the flame lasting duration of primary combustion.

Figure 7A:
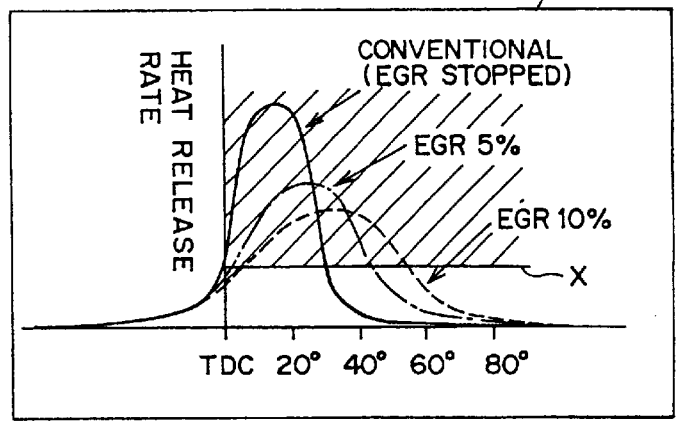

FIG. 7(A) shows a first map (7A), which indicates flame lasting durations and flame dying times as ending times of the respective flame lasting durations. The flame lasting durations have been set beforehand to cope with changes in heat release rate. These changes in turn correspond to control amounts associated with the primary-combustion-time exhaust gas recirculation rate (EGR rate). The first map (7A) is set so that the flame lasting duration becomes longer with the exhaust gas recirculation rate.

Figure 7B:
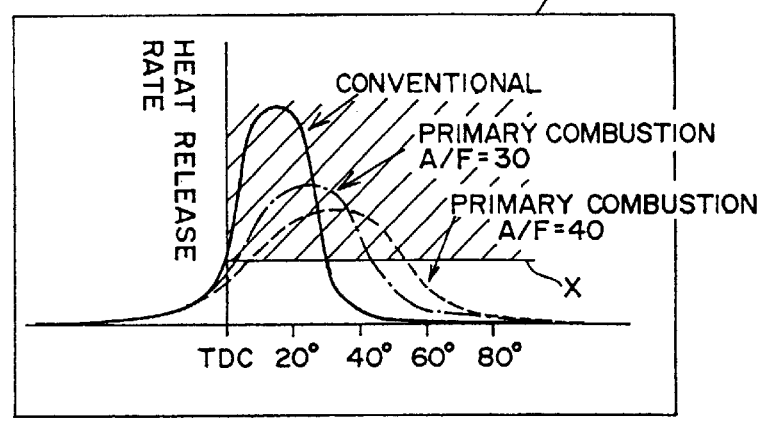

FIG. 7(B) depicts a second map (7B), which indicates flame lasting durations and flame dying times as ending times of the respective flame lasting durations. The flame lasting durations have been set beforehand to cope with changes in heat release rate. These changes in turn correspond to control amounts associated with the primary-combustion-time air/fuel ratio (A/F). The second map (7B) is set so that the flame lasting duration becomes longer as the air/fuel ratio becomes leaner.

Figure 7C:
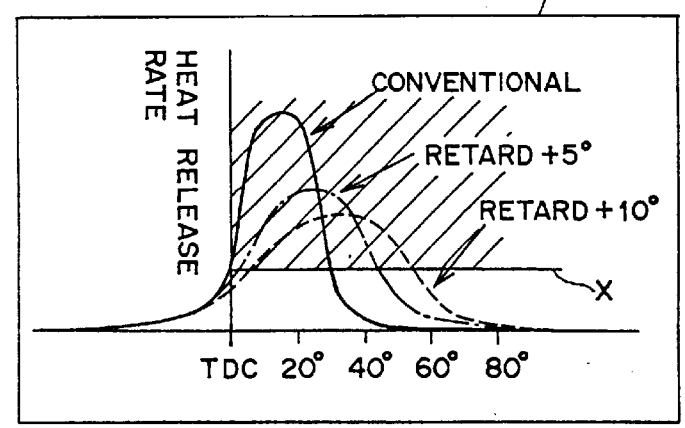

FIG. 7(C) shows a third map (7C), which indicates flame lasting durations and flame dying times as ending times of the respective flame lasting durations. The flame lasting durations have been set beforehand to cope with changes in heat release rate. These changes in turn correspond to control amounts associated with the primary-combustion-time ignition timing $T_{IG}$. The third map (7C) is set so that the flame lasting duration becomes longer as the retard in the ignition timing becomes greater.

In each of these FIGS. 7(A) to 7(C), the section indicated by hatching indicates flame lasting durations. The intersecting points between a boundary line X and heat release rates, which correspond to control amounts associated with the corresponding parameter, indicate flame dying times corresponding to the control amounts associated with the same parameter.

To adjust an exhaust gas recirculation rate, the flame lasting duration adjusting unit 116C reads, from the first map (7A) shown in FIG. 7(A), a control amount which is associated with the exhaust gas recirculation rate and serves to extend the flame lasting duration as the temperature determined by the catalyst temperature sensor 26 becomes lower. The flame lasting duration adjusting unit 116C then controls the exhaust gas recirculation rate control unit 104 by the control unit 116C1 so that the control amount is obtained.

To adjust an ignition timing, the flame lasting duration adjusting unit 116C reads, from the second map (7B) shown in FIG. 7(B), a control amount which is associated with the ignition timing and serves to extend the flame lasting duration as the temperature determined by the catalyst temperature sensor 26 becomes lower. The flame lasting duration adjusting unit 116C then controls the ignition timing control unit 107 by the control unit 116C1 so that the control amount is obtained.

To adjust an air/fuel ratio, on the other hand, the flame lasting duration adjusting unit 116C reads, from the third map (7C) shown in FIG. 7(C), a control amount which is associated with the air/fuel ratio and serves to extend the flame lasting duration as the temperature determined by the catalyst temperature sensor 26 becomes lower. The flame lasting duration adjusting unit 116C then controls the conventional fuel injection control unit 103 by the control unit 116C1 so that the control amount is obtained.

The injection start time $T_{INJ}$ of additional fuel is then set by the injection start time setting unit 116 so that the injection of the additional fuel is performed within the flame lasting duration adjusted by the flame lasting duration adjusting unit 116C.

Assume, for example, that the activation of the catalyst 9 is insufficient and there is thus a need to raise the temperature of exhaust gas, as in a case where the engine is continuously operated with the air/fuel ratio held lean. Since the exhaust gas heating system according to this modification is constructed as described above, the exhaust gas recirculation rate control unit 104 is controlled by the flame lasting duration adjusting unit 116C so that the exhaust gas is recirculated only in a small proportion (about 20% or so at the maximum) to adjust, i.e., extend the flame lasting duration of primary combustion. Further, the injection start time $T_{INJ}$ of additional fuel is set by the injection start time setting unit 116 such that the additional fuel is injected within the flame lasting duration adjusted by the flame lasting duration adjusting unit 116. Incidentally, such control of an exhaust as recirculation rate is performed when the catalyst temperature θc.c is somewhat lower than the activation temperature.

Compared with a case where the control of an exhaust gas recirculation rate by the flame lasting duration adjusting unit 116 is not performed (exhaust gas recirculation rate: 0), the above-described control can reduce the heat release rate of thermal energy, which has been obtained by the additional combustion, to an expansion stroke so that the temperature of exhaust gas can be made higher although the injection quantity of the additional fuel is the same. This makes it possible to more efficiently heat exhaust gas, thereby bringing about an advantage that the catalyst temperature θc.c can be promptly brought to the target temperature θo. In addition, the efficiency of purification of exhaust gas can be increased by recirculating the exhaust gas.

If there is a need to substantially increase the temperature of exhaust gas for the activation of the catalyst 9 as in the case of a start-up of the engine when the engine is still cool, the exhaust gas recirculation rate is set at 0 by the exhaust gas recirculation rate control unit 104 to retain remaining oxygen in a quantity sufficient for the combustion of additional fuel without performing the control by the control unit 116C1 of the flame lasting duration adjusting unit 116C.

By decreasing the exhaust gas recirculation rate or reducing it to zero in the above-described manner upon heating exhaust gas, fresh air is allowed to flow in additionally in a quantity corresponding to the decrease or reduction in the exhaust gas recirculation rate. This leads to an increase in the inducted air quantity and hence, to an increase in the quantity of surplus oxygen remaining in the cylinder after the primary combustion. This makes it possible to increase the injection quantity of additional fuel and as a consequence, to produce more heat upon additional combustion. It is therefore possible to improve the heating rate of the exhaust gas.

If there is a need to raise the temperature of exhaust gas due to insufficient activation of the catalyst 9, for example, as in a case where the engine is continuously operated with the air/fuel ratio held lean, the ignition timing control unit 107 is controlled by the flame lasting duration adjusting unit 116C to retard the ignition timing $T_{IG}$ so that the flame dying time of the primary combustion is delayed, and moreover, the ignition start time $T_{INJ}$ for the additional fuel is set by the injection start time setting unit 116 so that the additional fuel is injected during the flame lasting duration adjusted by the flame lasting duration adjusting unit 116C.

As a result, compared with a case where the adjustment of the ignition timing $T_{IG}$ by the flame lasting duration adjusting unit 116C is not performed, the thermal energy obtained by the additional combustion is used in a smaller proportion for the expansion of gas in the expansion stroke so that, although the additional fuel is injected in the same quantity, the exhaust gas can be more efficiently heated to a higher temperature. This has brought about the advantage that the catalyst temperature θc.c can be more promptly raised to the target temperature θo and also the advantage that the deterioration in specific fuel consumption can be significantly reduced.

Like the above-described controls of exhaust gas recirculation rate and ignition timing, thermal energy available from additional combustion can also be effectively used to obtain exhaust gas of a high temperature by adjusting the air/fuel ratio of primary combustion to a leaner side on the basis of the above-mentioned map (7B) of FIG. 7(B) to such an extent that the maximum pressure within the combustion chamber and the crank angle corresponding to the maximum pressure do not vary.

Figure 8A:
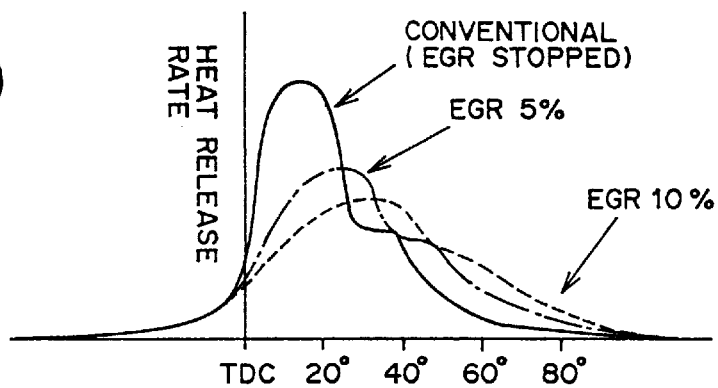
Figure 8B:
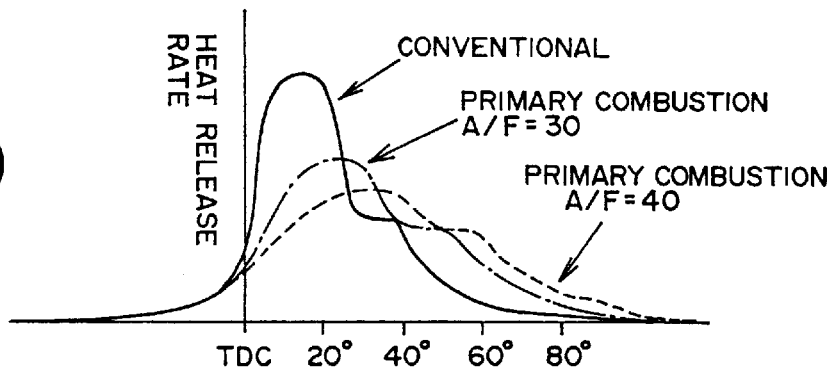
Figure 8C:
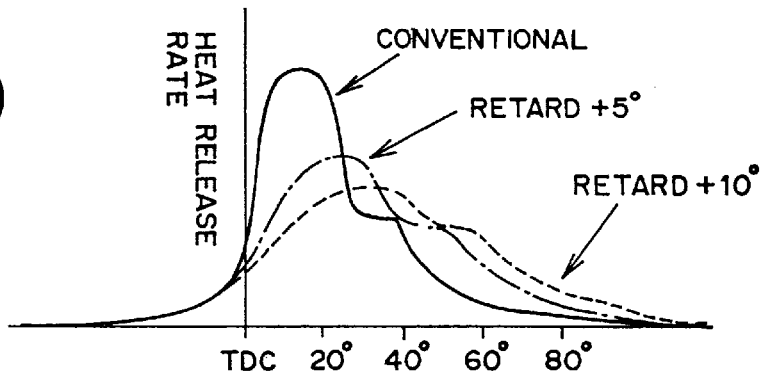

Further, FIGS. 8(A), 8(B) and 8(C) diagrammatically illustrate variations in heat release rate corresponding to individual control amounts when additional fuel was injected by adjusting the exhaust gas recirculation rate, the air/fuel ratio of primary fuel, and the ignition timing of the primary fuel through the flame lasting duration adjusting unit 116C so that the flame dying time is delayed, in other words, the flame lasting duration is extended. In these diagrams, the solid curves indicate conventional cases where the exhaust gas recirculation rate, the air/fuel ratio of the primary fuel, and the ignition timing of the primary fuel as the parameters for heating the exhaust gas were not changed.

It is understood from these figures that, even when additional fuel is injected in the same quantity, an adjustment of each of such parameters can reduce the proportion of thermal energy, which is available from additional combustion and is to be used for the expansion of gas in the expansion stroke, and can hence heat exhaust gas to a higher temperature.

A description will next be made of a second modification of the first embodiment.

According to the second modification, especially at the time of a low-temperature engine start-up, which is considered to require activation of the catalyst 9, the injection start time is set by the injection start time setting unit 116 so that, as described above, additional fuel is injected during a flame lasting duration in which a flame of primary combustion based on an injection of primary fuel in an expansion stroke remains; and, when the engine is brought into such an operation state that the catalyst temperature θc.c is expected to drop to a temperature lower than a target temperature θo (for example, an idling operation state or a decelerated operation state) after the catalyst 9 has reached the target temperature θo or close to the target temperature θo, the injection start time is set by the injection start time setting unit 116 to perform an additional fuel injection at a timing later than the additional fuel injection timing for the low-temperature start-up, that is, after the flame lasting duration (for example, at the end of the expansion stroke or in an exhaust stroke), whereby the fuel still remaining in the unburnt form in the exhaust gas is caused to burn by the catalyst 9 to achieve heating and activation of the catalyst 9.

Accordingly, the additional fuel is not injected in an expansion stroke but is injected after the expansion stroke. This makes it possible to reduce the possibility that the heat available from the additional combustion may be used for gas-expanding work, thereby bringing about the advantage that the exhaust can be efficiently heated.

Namely, especially at the time of a low-temperature start-up which is considered to require activation of the catalyst 9, the exhaust gas is subjected to re-combustion in the expansion stroke so that the temperature of the exhaust gas is significantly raised to efficiently activate the catalyst. Further, after the catalyst temperature θc.c has reached the target temperature θo or close to the target temperature θo, the engine may be brought into an idling operation state or a decelerated operation state which has the potential problem that the catalyst temperature may drop. In this case, the fuel which still remains in the unburnt form in the exhaust gas is caused to burn by the catalyst 9. This has brought about the advantage that the catalyst 9 can be efficiently activated.

In the above-described second modification, the injection timing of the additional fuel was changed to the specific timing (flame lasting duration) in the expansion stroke or to the timing later than the specific timing depending on whether the additional fuel injected at the time of a start-up or in an operation state other than such a start-up. A basis for such a change in the injection timing is, however, not limited to such a change in the operation state.

As an alternative, a detection unit is arranged to detect or estimate whether or not a catalyst temperature θc.c determined by the catalyst temperature sensor 26 is not lower than a lowest temperature (preset temperature) at which the additional fuel, namely, the fuel still remaining in the unburnt form in exhaust gas can burn within the catalyst (exhaust gas purification device). Based on an output from the detection unit, an injection start time is set by the injection start time setting unit 116.

First, when the catalyst temperature θc.c determined by the catalyst temperature sensor 26 is detected or estimated to be equal to or higher than the preset temperature, an injection start time is set by the injection start time setting unit 116 so that the additional fuel is injected after the flame lasting duration (for example, at the end of the expansion stroke or in the exhaust stroke).

As a result, the fuel (i.e., the additional fuel) which still remains in the unburnt form in the exhaust gas is allowed to burn within the catalyst. The unburnt hydrocarbons therefore begin to burn inside the catalyst without being used for the gas-expanding work, so that the heating of the catalyst can be efficiently performed.

When the catalyst temperature θc.c determined by the catalyst temperature sensor 26 is detected or estimated to be lower than the preset temperature, on the other hand, the gas still remaining in the unburnt form in the exhaust gas cannot undergo burning inside the catalyst. An injection start time is therefore set by the injection start time unit 116 so that the injection of the additional fuel is performed within the flame lasting duration in which a flame still remains (for example, in an expansion stroke).

This assures combustion of the additional fuel within the cylinder so that the catalyst can be heated without emission of the additional fuel in the unburnt form. Incidentally, the above-mentioned lowest temperature is lower than the target temperature θo which corresponds to a temperature required for bringing the catalyst into an activated state.

In addition, the exhaust gas can be heated more efficiently if the fuel injection quantity, that is, the fuel injecting duration (hence, the injector driving duration) is set by the injecting duration setting unit 102 in accordance with the above-described respective parameters.

A description will next be made about the second embodiment. As is illustrated in FIG. 10, the exhaust gas heating system of the second embodiment for the in-cylinder injection internal combustion engine is different from that of the first embodiment in that the additional fuel injection control unit 102 is equipped with a different injecting duration setting unit 114.

Figure 10:
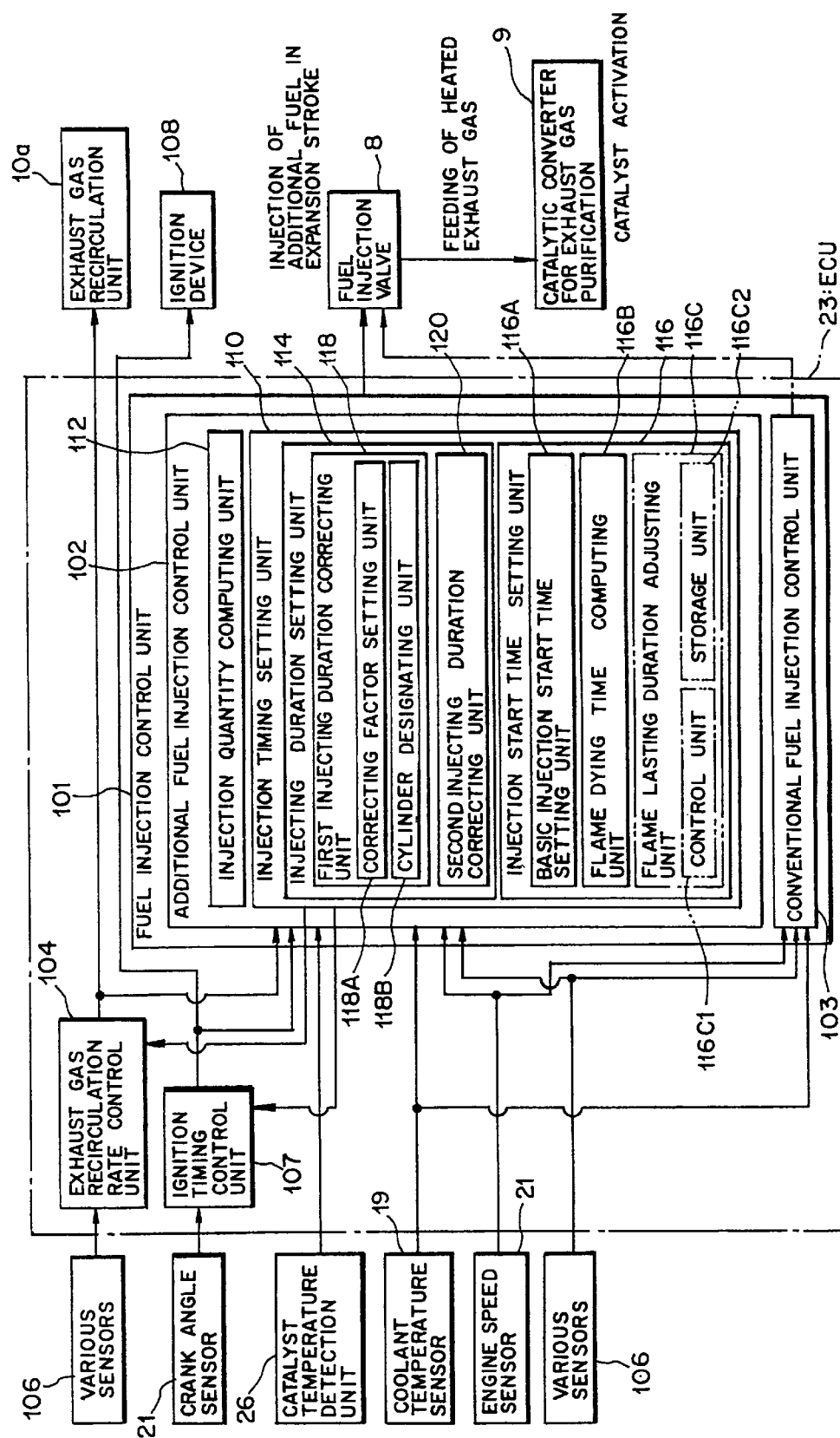
FIG. 10 is a control block diagram schematically illustrating the construction of an essential part of a control system of an exhaust gas heating system according to a second embodiment of the present invention for an in-cylinder injection internal combustion engine.

Described specifically, the injecting duration setting unit 114 in this embodiment is provided with a cylinder designating unit 118B as shown in FIG. 10, so that the cylinder designating unit 118B specifies one or more particular cylinders to inject additional fuel thereinto with a view to adjusting the quantity of fuel in injecting additional fuel.

The remaining construction of the exhaust heating system according to this embodiment for the in-cylinder injection internal combustion engine are similar to that of the above-described first embodiment. Its description is therefore omitted herein.

The cylinder designating unit 118B designates one or more cylinders for the injection of additional fuel. Namely, when the catalyst temperature θc.c is substantially lower than the target temperature θo, it is considered to perform the additional fuel injection in all cylinders. In this case, the cylinder designating unit 118B designates all the cylinders for the injection of additional fuel.

When the catalyst temperature θc.c is slightly lower than the target temperature θo, on the other hand, it is sufficient to perform the additional fuel injection in only one or some of the cylinders during a single combustion cycle in the course of which each cylinder undergoes one combustion stroke. In this case, the cylinder designating unit 118B designates only such one or some of the cylinders for the injection of additional fuel.

In this case, as such one or some of the cylinders for the injection of additional fuel, one or some particular cylinders may be chosen. As an alternative, a plurality of combustion cycles may be performed by choosing one or some cylinders for the injection of additional fuel per combustion cycle.

A description will next be made taking, as an example, a case in which the additional fuel injection is performed in only one cylinder per combustion cycle. In the case of a 4-cylinder engine such as that illustrated in FIG. 4, combustion takes place in the order of the first cylinder (#1), the third cylinder (#3), the fourth cylinder (#4) and the second cylinder (#2). In each combustion cycle in the course of which each of the first, third, fourth and second cylinders undergoes one combustion stroke, the additional fuel injection can always be performed only in a particular cylinder (for example, the first cylinder).

As an alternative, the additional fuel injection may also be performed by selecting all the cylinders one after one in each combustion cycle, for example, by performing an additional fuel injection only in the first cylinder in a given combustion cycle, another additional fuel injection only in the third cylinder in the next combustion cycle, a further additional fuel injection only in the fourth cylinder in the subsequent combustion cycle, a still further additional fuel injection only in the second cylinder in the still further combustion cycle, and so on.

As a further alternative, the additional fuel injection may also be performed by choosing only some of the cylinders (for example, the first cylinder and the fourth cylinder) as needed, for example, by performing an additional fuel injection only in the first cylinder in a given combustion cycle, another additional fuel injection only in the fourth cylinder in the next combustion cycle, a further additional fuel injection only in the first cylinder in the subsequent combustion cycle, a still further additional fuel injection only in the fourth cylinder in the still further combustion cycle, and so on.

Further, when the additional fuel injection is performed only in two cylinders or three cycles per combustion cycle, the additional fuel injection can be performed by using only particular cylinders or employing all or some of the cylinders in an appropriate order.

These additional fuel injection methods, which rely upon only some cylinders, are of course applicable not only to 4-cylinder engines but also to engines of other types.

For the injection of additional fuel, the cylinder designating unit 118B designates one or more particular cylinders in such a way that more cylinders are designated for the injection of the additional fuel as the catalyst temperature θc.c drops further from the target temperature θo and the additional fuel is injected into substantially all the cylinders when the catalyst temperature θc.c has become lower by at least a predetermined value than the target temperature θo.

A description will hereinafter be made with respect to the setting of an injector driving duration $t_{PLUS}$ in an expansion stroke at the injecting duration setting unit 102 in this embodiment, including the designation of cylinders by the cylinder designating unit 118B.

Since the designation of cylinders by the cylinder designating unit 118B corresponds to the correction of a fuel quantity (equivalent to $t_{PLUS}$) in accordance with the catalyst temperature θc.c in the above-described first embodiment, a description will first be made of the premise, that is, the setting of an injector driving time $t_{PLUS}$ in an expansion stroke by the injecting duration setting unit 102B, followed by the description of the designation of cylinders by the cylinder designating unit 118B.

First, the setting of the expansion-stroke injector driving duration $t_{PLUS}$ by the injecting duration setting unit 114 will be described. This setting of the expansion-stroke injector driving duration $t_{PLUS}$ is performed by correcting a basic driving duration $t_B$, which serves as a basis for an injection of additional fuel in the expansion stroke, by an injection start time $T_{INJ}$.

Here, the basic driving duration $t_B$ is calculated as in the above-described first embodiment, and the correction by the expansion-stroke injection start time $T_{INJ}$ is also performed in a similar manner as in the above-described first embodiment.

Accordingly, the expansion-stroke injector driving duration $t_{PLUS}$ can be determined by the following formula:

$$t_{PLUS} = t_B \times K_1$$

A description will next be made with respect to the designation of one or more cylinders by the cylinder designating unit 118B.

At the cylinder designating unit 118B, the number of injection-performing cylinder(s) in each of which an additional fuel injection is to be performed in an expansion stroke, (hereinafter referred to as the "injection-performing cylinder number") $N_{INJ}$ is set in accordance with a catalyst temperature θc.c. This adjustment of the injection-performing cylinder number therefore makes it possible to the fuel quantity in accordance with the catalyst temperature θc.c.

Figure 17C:
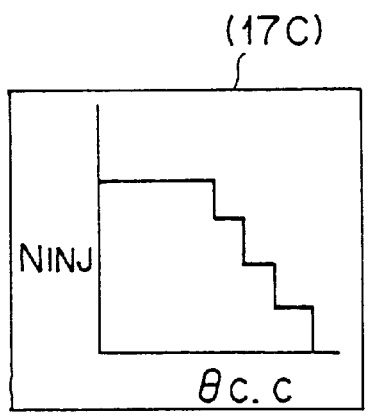

Described specifically, the correction of the fuel quantity by the cylinder designating unit 118B in accordance with a catalyst temperature θc.c detected by the catalyst temperature sensor 26 is performed as illustrated in FIG. 17(C), namely, by determining an injection-performing cylinder number $N_{INJ}$, in other words, either increasing or decreasing the injection-performing cylinder number $N_{INJ}$ in accordance with the catalyst temperature θc.c with reference to a cylinder number map (17C) preset corresponding to various catalyst temperatures θc.c.

As is illustrated in FIG. 17(C), the cylinder number map (17C) is set to adjust the fuel quantity in such a way that the additional fuel injection is performed in all the cylinders when the catalyst temperature θc.c is low and the injection-performing cylinder number $N_{INJ}$ is decreased as the catalyst temperature θc.c rises and approaches the target temperature θo.

Figure 11:
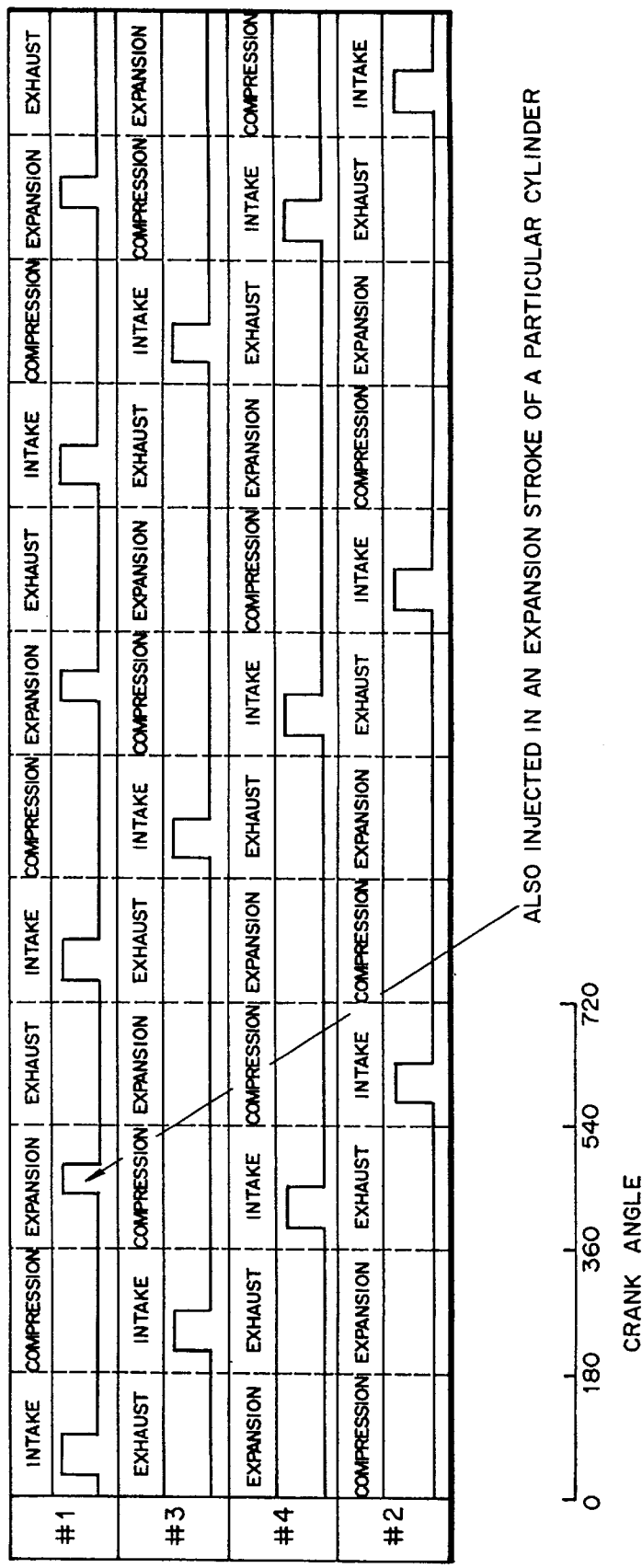
FIG. 11 is a chart showing an injection timing of additional fuel by the exhaust gas heating system according to the second embodiment of the present invention for the in-cylinder injection internal combustion engine.

In accordance with the injection start time $T_{INJ}$ and injector driving duration $t_{PLUS}$ set as described above, an additional fuel injection is performed in an expansion stroke in addition to a conventional fuel injection as shown in FIG. 11. Incidentally, FIG. 11 illustrates a case in which the expansion-stroke additional fuel injection is performed only in the first cylinder (#1) designated as a particular cylinder.

Figure 12:
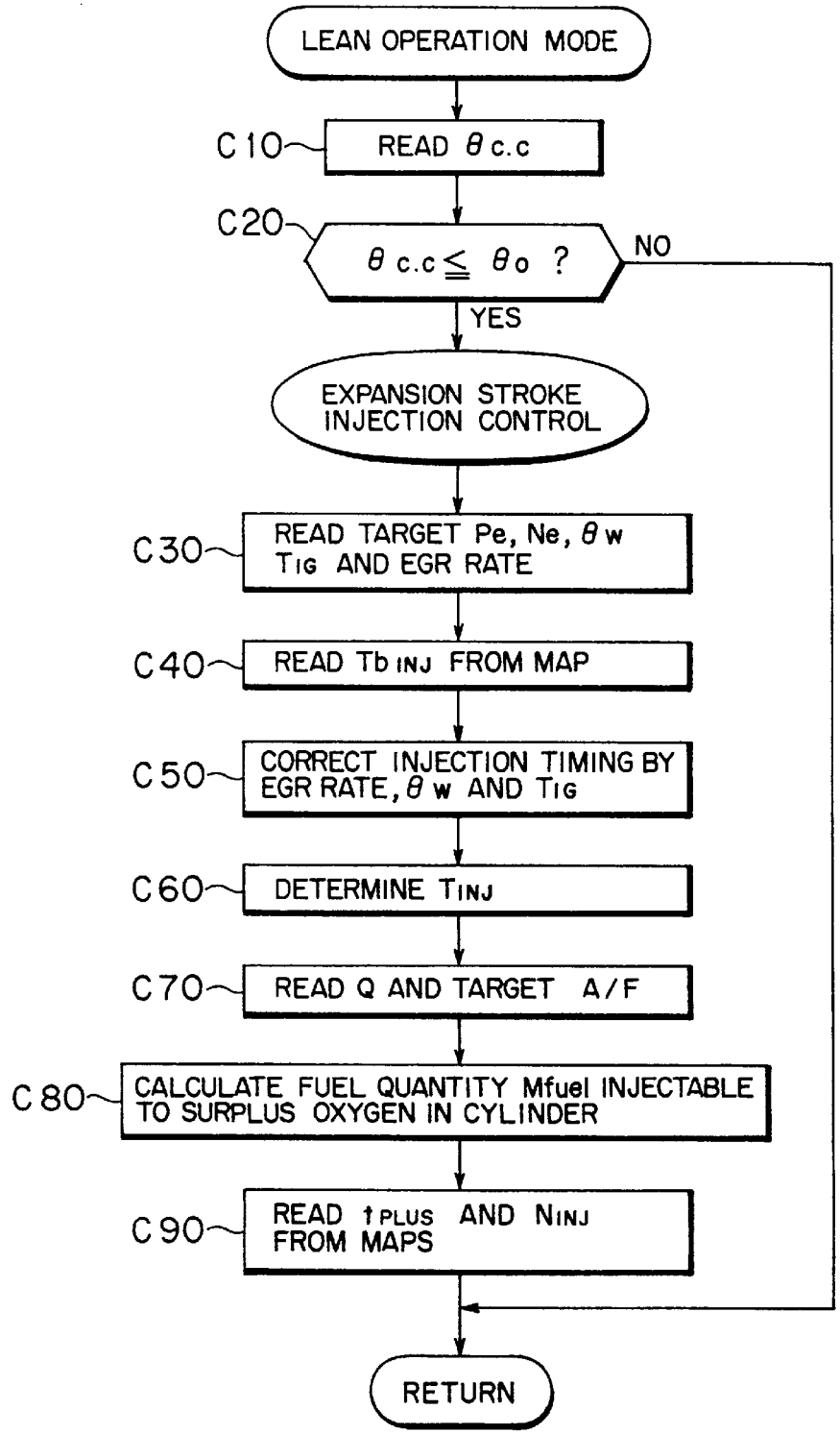
FIG. 12 is a flow chart for explaining control of an injection of additional fuel by the exhaust gas heating system according to the second embodiment of the present invention for the in-cylinder injection internal combustion engine.

As the exhaust gas heating system according to the second embodiment of the present invention for the in-cylinder injection internal combustion engine is constructed as described above, control of conventional fuel injections is performed, for example, as in the first embodiment (see FIG. 5(A)) and moreover, control of additional fuel injections (expansion-stroke fuel injection control) is conducted, for example, as depicted in FIG. 12.

Since the conventional fuel injection control is similar to that performed in the first embodiment, its description is omitted herein.

The additional fuel injection control by this system is different only in step C90 from the additional fuel injection control by the system of the first embodiment.

Namely, steps C10 to C80 correspond to steps B10 to B80, respectively, and perform similar processing. Their description is therefore omitted herein.

In step C90, an expansion-stroke injector driving duration $t_{PLUS}$ is set by correcting a basic driving duration $t_B$, which serves as a basis for an additional fuel injection in an expansion stroke, in accordance with an injection start time $T_{INJ}$.

Further, to set a fuel quantity corresponding to a catalyst temperature θc.c, an injection-performing cylinder number $N_{INJ}$ is determined based on the catalyst temperature θc.c with reference to the cylinder number map (17C) preset as shown in FIG. 17(C).

The term "injection-performing cylinder number $N_{INJ}$" indicates the number of cylinder(s) in each of which an additional fuel injection is performed while the crankshaft rotates over 720°. As is illustrated in FIG. 17(C), the additional fuel injection is performed in a plurality of cylinders (all the cylinders in this embodiment) when the catalyst temperature θc.c is low and, as the catalyst temperature θc.c rises, the injection-performing cylinder number is decreased further.

Upon decreasing the number of cylinders for use in performing the additional fuel injection as described above, the fuel injection can be performed as described above, namely, by using only particular one or more cylinders or by using the cylinders successively, one or more cylinders but not all the cylinders per combustion cycle, without limiting the injection-performing cylinder(s) to any particular cylinder(s).

As the exhaust gas heating system of this embodiment for the in-cylinder injection internal combustion engine is constructed as described above, it can bring about similar advantageous effects as the first embodiment.

In addition, the fuel quantity of the additional injection can be set by adjusting the injection-performing cylinder number on the basis of the catalyst temperature θc.c. This has an advantage that the catalyst 9 can be heated without practically deteriorating the gas mileage.

Namely, additional fuel can be injected in one or more particular cylinders or in particular cylinders, which have been designated to use all the cylinders in more than one combustion cycle, when the catalyst temperature θc.c is slightly lower than the target temperature θo. This makes it possible to raise the catalyst temperature θc.c to the target temperature θo while minimizing a deterioration in gas mileage and also preventing overheating of the catalyst 9.

If the injection-performing cylinder number is increased as the catalyst temperature θc.c becomes still lower than the target temperature θo and further, if the additional fuel is injected into substantially all the cylinders when the catalyst temperature θc.c has become lower by at least a predetermined value than the target temperature θo, the catalyst temperature θc.c can be promptly raised to the target temperature θo.

Figure 13:
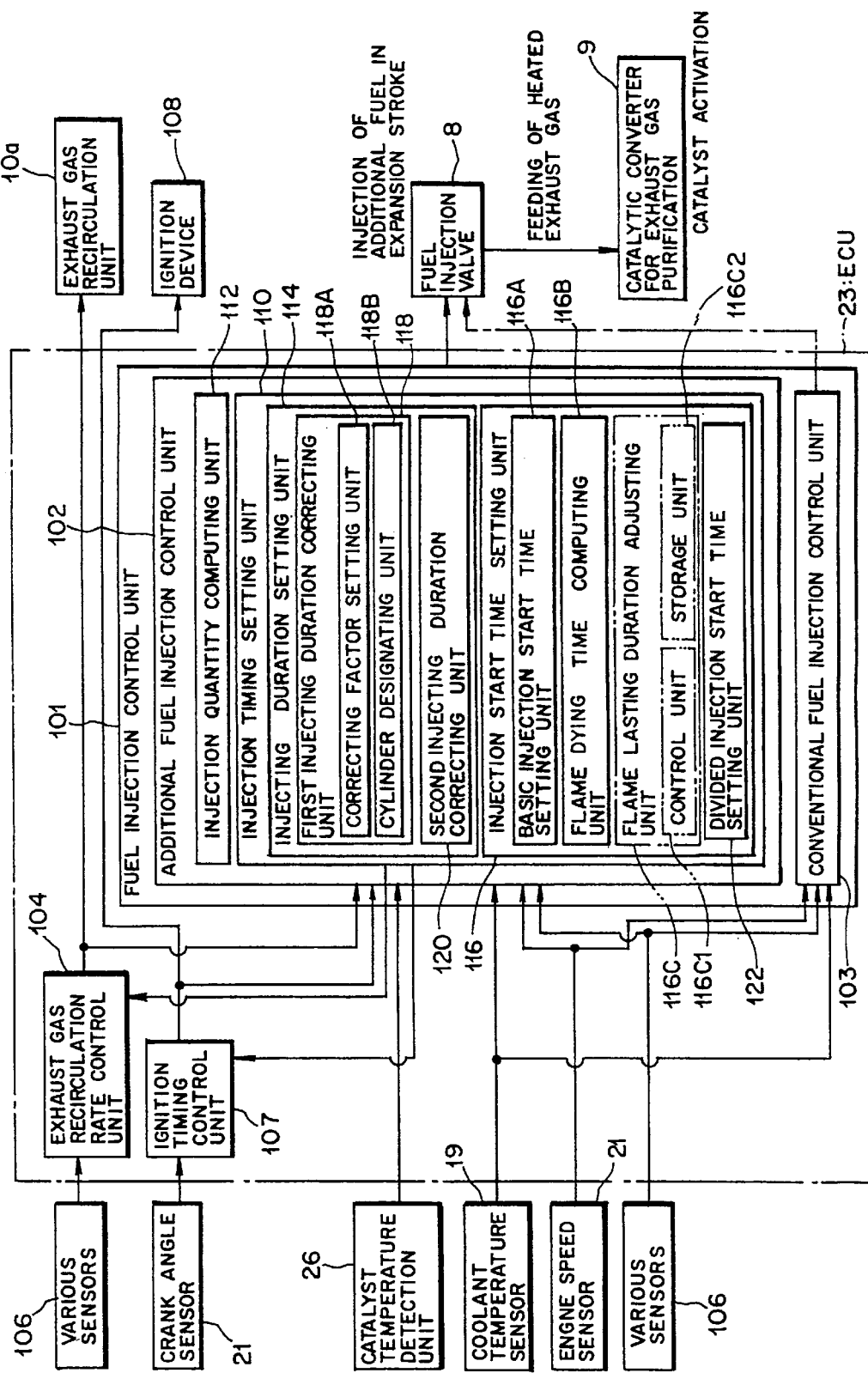
FIG. 13 is a control block diagram schematically illustrating the construction of an essential part of a control system of an exhaust gas heating system according to a third embodiment of the present invention for an in-cylinder injection internal combustion engine.

A description will next be made about the third embodiment. The exhaust gas heating system of the third embodiment for the in-cylinder injection internal combustion engine is constructed like the second embodiment as shown in FIG. 13, but is different from the system of the second embodiment in the functions of an injecting timing setting unit 110 and an injecting duration setting unit 114, which an additional fuel injection control unit 102 is equipped with. In essence, the exhaust gas heating system of this embodiment for the in-cylinder injection internal combustion engine is different in that additional fuel is injected twice in an expansion stroke.

In this embodiment, the ignition timing setting unit 110 is provided with a function to set injection start times of plural divided injections (divided injection start time setting unit) 122 so that an injection quantity of additional fuel determined by the injection quantity computing unit 112 is divided in plural portions (N portions), and the injecting duration setting unit 114 is provided with a function to set injecting durations of the plural divided injections. In this embodiment, the injection quantity of the additional fuel is divided into two portions. Accordingly, the first divided injection is an $(N-1)^{th}$ divided injection, and the second divided injection is an $N^{th}$ divided injection.

First, the divided injection start time setting unit 122 sets the first ($N-1^{th}$) injection start time $T1_{INJ}$ in and the second ($N^{th}$) injection start time $T2_{INJ}$ in at least an expansion stroke.

Of these divided injection start times, the first injection start time $T1_{INJ}$ in the expansion stroke is calculated in a similar manner as the expansion-stroke injection start time $T_{INJ}$ in the first embodiment.

The second injection start time $T2_{INJ}$ in the expansion stroke, on the other hand, is determined based on the expansion-stroke first injection start time $T1_{INJ}$, a coolant temperature θw, and a fuel quantity $M_{fuel}$ injectable to surplus oxygen in a cylinder. It is preferable to set the expansion-stroke second injection start time $T2_{INJ}$ at a time immediately before an exhaust valve opens.

Because, as has been explained above with reference to FIG. 9 in connection with the first embodiment, thermal energy of the additional combustion can be used efficiently.

Figure 16:
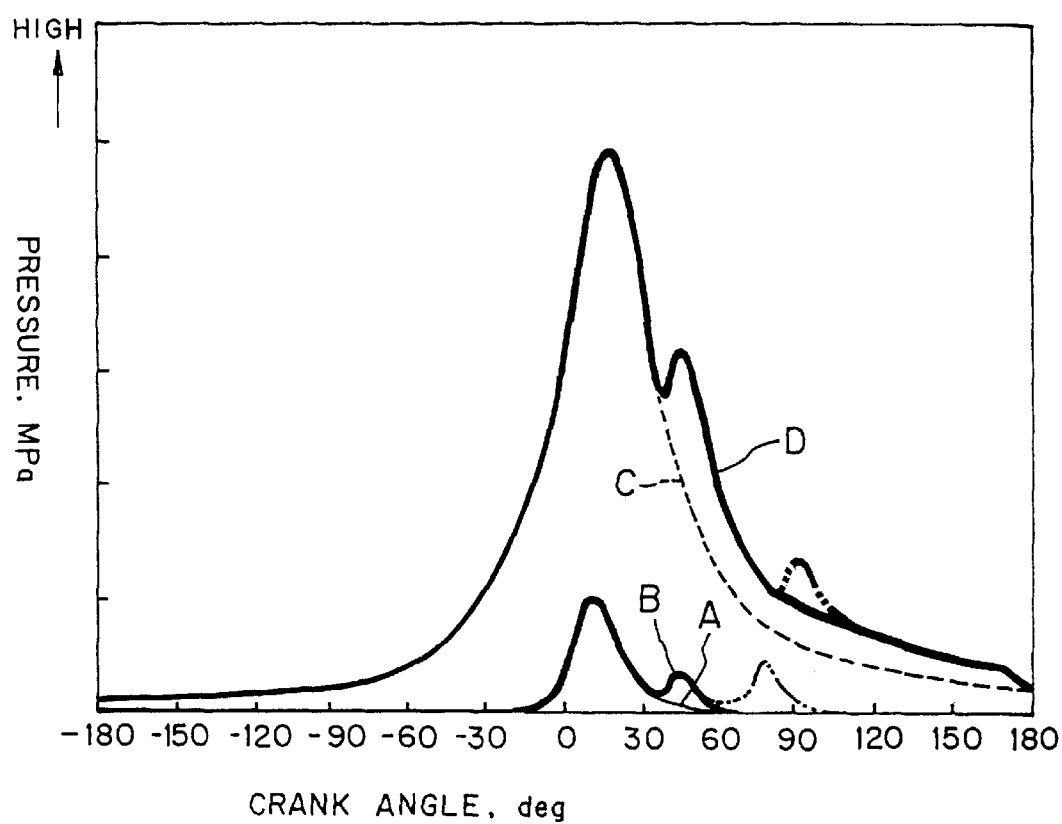
FIG. 16 is a diagram for explaining an internal cylinder pressure and a heat release rate when an injection of additional fuel is performed in an expansion stroke by the exhaust gas heating system according to the third embodiment of the present invention for the in-cylinder injection internal combustion engine.

This will be described in further detail with reference to FIG. 16. If the first additional fuel injection is performed at a timing as late as possible within a flame lasting duration of primary combustion corresponding to a heat release rate indicated by a curve A, the flame lasting duration is extended as indicated by a curve B. Further, if the second additional fuel injection is performed at a timing as late as possible within a flame lasting duration of the first additional fuel injection indicated by the curve B, the flame lasting duration is extended as indicated by a phantom (long and two short dashes line) in the diagram so that the proportion of thermal energy used for the expanding work becomes smaller. As a consequence, the thermal energy obtained by the additional combustion can be used more effectively for heating exhaust gas.

Further, the injecting duration setting unit 114 is designed to set at least a first ($N-1^{th}$) injector driving duration $t1_{PLUS}$ at least in an expansion stroke and a second ($N^{th}$) injector driving duration $t2_{PLUS}$ in the expansion stroke. In addition, the cylinder designating unit 118B which the injecting duration setting unit 114 is provided with designates an injection-performing cylinder number.

This injecting duration setting unit 114 is also designed to set the expansion-stroke first injector driving duration $t1_{PLUS}$ and the expansion-stroke second injector driving duration $t2_{PLUS}$ so that the additional fuel is injected in a fuel quantity $M_{fuel}$ corresponding to surplus oxygen still remaining in the cylinder after the primary combustion.

Specifically, the setting of the expansion-stroke first injector driving duration $t1_{PLUS}$ by the injecting duration setting unit 114 is conducted by correcting a basic driving duration $t_B$, which serves as a basis for the additional fuel injections in the expansion stroke, in accordance with the expansion-stroke first injection start time $T1_{INJ}$ and a coolant temperature θw.

Namely, the expansion-stroke first injector driving duration $t1_{PLUS}$ is set by correcting the basic driving duration $t_B$ to inject the fuel in such a quantity that the flame dying time can be delayed and can be brought toward an opening timing of an exhaust valve as close as possible. Preferably, the fuel is injected in such a quantity that the flame dying time can be delayed to the opening timing of the exhaust valve. Further, the expansion-stroke first injector driving duration $t1_{PLUS}$ is set so that the fuel is injected in a quantity smaller than the injection quantity of the expansion-stroke second fuel injection. This makes it possible to have thermal energy, which has been obtained by the additional combustion, used in a smaller proportion for expanding gas in the expansion stroke and also to improve the gas mileage.

The basic driving duration $t_B$ is calculated in a similar manner as in the above-described first and second embodiments, so that its description is omitted herein. The basic driving duration $t_B$ is calculated as the sum of the expansion-stroke first injector driving duration $t1_{PLUS}$ and the expansion-stroke second injector driving duration $t2_{PLUS}$.

Further, the correction by the expansion-stroke first injection start time $T1_{INJ}$ is performed in a similar manner as the correction by the injection start time $T_{INJ}$ in the above-described first and second embodiments. Its description is therefore omitted herein.

Figure 17D:
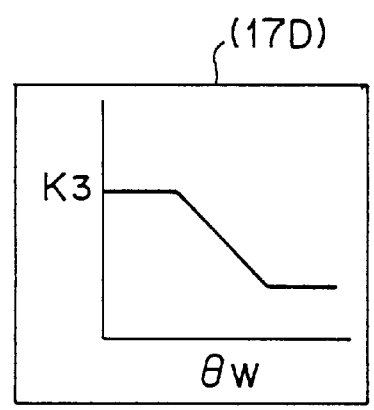

In addition, the correction by the coolant temperature θw as the engine temperature is performed by determining an injection percentage factor (third injecting duration correction factor) $K_3$ based on the coolant temperature θw with reference to a map (17D), in which injection percentage factors are set relative to various coolant temperatures θw, as shown in FIG. 17(D) and then multiplying the basic driving duration $t_B$ with the injection percentage factor $K_3$ ($t_B \times K_3$).

The map (17D) is set in such a way that, as is shown in FIG. 17(D), the expansion-stroke first injector driving duration $t1_{PLUS}$ becomes shorter as the coolant temperature θw rises. Specifically, the map (17D) is set such that the percentage of the first injector driving duration $t1_{PLUS}$ (namely, the $N-1^{th}$ divided injection quantity) becomes greater than the second injector driving duration $t2_{PLUS}$ (namely, the $N^{th}$ divided injection quantity) when the coolant temperature θw is low. The map (17D) is also set such that the percentage of the first injector driving duration $t1_{PLUS}$ (namely, the $N-1^{th}$ divided injection quantity) becomes smaller than that of the second injector driving duration $t2_{PLUS}$ (namely, the $N^{th}$ divided injection quantity) as the coolant temperature θw rises.

In the above-described manner, the expansion-stroke first injector driving duration $t1_{PLUS}$ is determined by the following formula:

$$t1_{PLUS} = t_B \times K_I \times K_3$$

Next, the setting of the expansion-stroke second injector driving duration $t2_{PLUS}$ by the injecting duration setting unit 114 is performed by correcting the basic driving duration $T_B$, which serves as the basis for the additional fuel injection in the expansion stroke, in accordance with the expansion-stroke second injection start time $T2_{INJ}$ and the coolant temperature θw.

The basic driving duration $t_B$ is calculated in a similar manner as in the above-described setting of the expansion-stroke first injector driving duration $t1_{PLUS}$.

Further, the correction by the expansion-stroke second injection start time $T2_{INJ}$ is carried out in a similar manner as in the above-described setting of the expansion-stroke first injector driving duration $t1_{PLUS}$.

In addition, the correction by the coolant temperature θw is performed as in the case of the above-described setting of the expansion-stroke first injector driving duration t1$_{PLUS}$, namely, by determining an injection ratio factor K$_3$ based on the coolant temperature θw with reference to the map (17D), in which injection percentage factors have been set beforehand relative to various coolant temperatures θw as shown in FIG. 17(D), and then multiplying the basic driving duration t$_B$ with (1−K$_3$) obtained from the injection percentage factor K$_3$ [t$_B$×(1−K$_3$)].

In this manner, the expansion-stroke second injector driving duration t2$_{PLUS}$ can be determined by the following formula:

$$t2_{PLUS} = t_B \times K_1 \times (1-K_3)$$

The correction of the fuel quantity in accordance with the catalyst temperature θc.c is performed by adjusting the number of cylinder(s), in each of which an additional fuel injection is to be performed, by the cylinder designating unit 118B in a similar manner as in the above-described second embodiment. Described specifically, this correction is performed by determining, that is, either increasing or decreasing the injection-performing cylinder number N$_{INJ}$ on the basis of the catalyst temperature θc.c with reference to the preset map (17D) as shown in FIG. 17(D).

Figure 14:
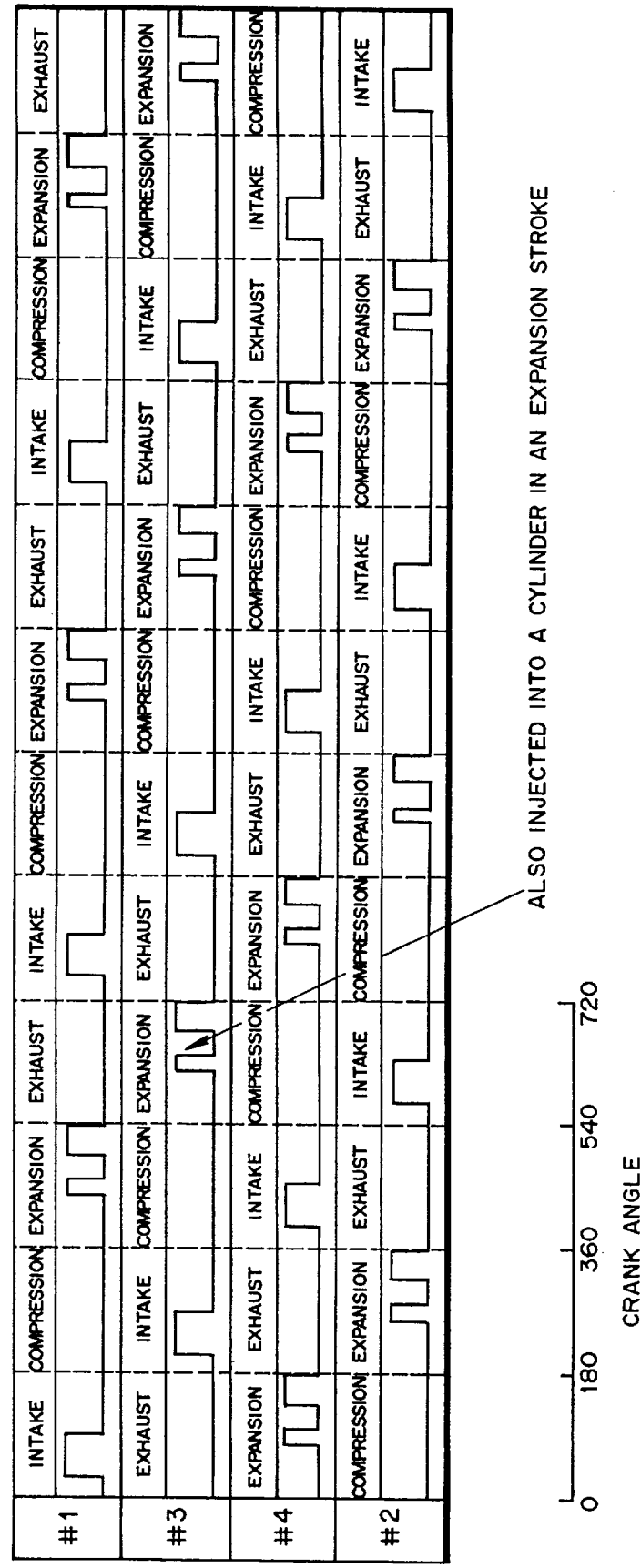
FIG. 14 is a chart showing an injection timing of additional fuel by the exhaust gas heating system according to the third embodiment of the present invention for the in-cylinder injection internal combustion engine.

In accordance with the thus-set injection start times T1$_{INJ}$, T2$_{INJ}$ and injecting durations t1$_{PLUS}$, t2$_{PLUS}$, the additional fuel injections are performed in the expansion stroke in addition to the conventional fuel injection as illustrated in FIG. 14. Incidentally, FIG. 14 illustrates a case in which the expansion-stroke additional fuel injection is performed in all the cylinders.

Figure 15:
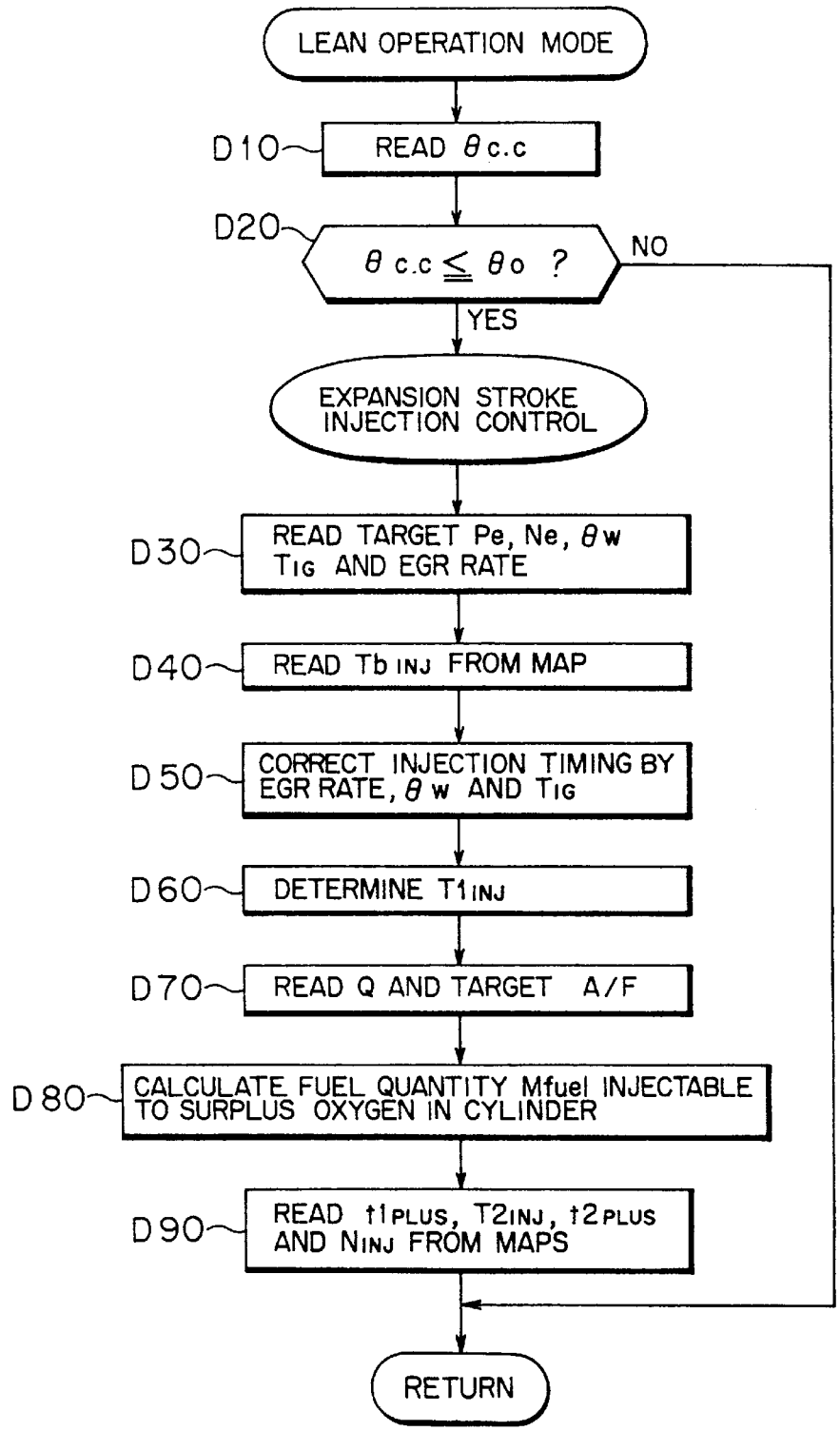
FIG. 15 is a flow chart for explaining control of an injection of additional fuel by the exhaust gas heating system according to the third embodiment of the present invention for the in-cylinder injection internal combustion engine.

As the exhaust gas heating system according to the third embodiment of the present invention for the in-cylinder injection internal combustion engine is constructed as described above, control of conventional fuel injections is performed, for example, as in the first and second embodiments [see FIG. 5(A)] and moreover, control of additional fuel injections (expansionstroke fuel injection control) is conducted, for example, as depicted in FIG. 15.

Since the conventional fuel injection control is similar to that performed in the first and second embodiments, its description is omitted herein.

The additional fuel injection control by this system is different only in step D60 and step D90 from the additional fuel injection control by the system of the first embodiment.

Namely, steps D10 to D50 correspond to steps B10 to B50 and steps D70 and D80 correspond to steps B70 and B80, respectively, and perform similar processing. Their description is therefore omitted herein.

In step D60, the expansion-stroke first injection start time T1$_{INJ}$ is set by the divided injection start time setting unit 122.

In step D90, on the other hand, the expansion-stroke second injection start time T2$_{INJ}$ is determined by the injection start time setting unit 102A on the basis of the expansion-stroke first injection start time T1$_{INJ}$, the coolant temperature θw, the fuel quantity M$_{fuel}$ injectable to the surplus oxygen in the cylinder.

Further, the expansion-stroke first injector driving duration t1$_{PLUS}$ and the expansion-stroke second injector driving duration t2$_{PLUS}$ are determined by the injecting duration setting unit 114.

Namely, the expansion-stroke first injector driving duration t1$_{PLUS}$ is determined by correcting the basic driving duration t$_B$ in accordance with the expansion-stroke first injection start time T1$_{INJ}$ and the coolant temperature θw, while the expansion-stroke second injector driving duration t2$_{PLUS}$ is determined by correcting the basic driving duration t$_B$ in accordance with the expansion-stroke second injection start time T2$_{INJ}$ and the coolant temperature θw.

In addition, the injection-performing cylinder number N$_{INJ}$ is determined by the cylinder designating unit 118B which the injecting duration setting unit 114 is equipped with.

As the exhaust gas heating system of this embodiment for the in-cylinder injection internal combustion engine is constructed as described above, it can bring about similar advantageous effects as the first and second embodiments.

In addition, the flame lasting duration can be extended by performing the first injection while the flame of the primary combustion still remains. This makes it possible to delay the second injection start time T2$_{INJ}$ (preferably to the end of the expansion stroke), so that the thermal energy of the additional combustion can be effectively used. This has led to an advantage that the thermal energy of the additional combustion can heat the exhaust gas and can promptly bring the catalyst temperature θc.c to the target temperature θo.

In the exhaust gas heating system of this embodiment for the in-cylinder injection internal combustion engine, the additional fuel injection is performed twice. However, this is not limited to twice and can be performed plural times (N times).

When the additional fuel is injected by dividing it into plural portions, it is not absolutely necessary to set the injection quantity of the first injection so that its flame remains until shortly before the exhaust valve opens. It is possible to set the injection quantity of a second or subsequent injection so that its flame dying time can be extended until shortly before the exhaust valve opens. Concerning the last (N$^{th}$) additional fuel injection, it is particularly preferred to set its timing at a timing immediately before the opening of the exhaust valve so that the last (N$^{th}$) additional fuel injection corresponds to the second additional fuel injection in the third embodiment. It is also preferred to set the injection quantity of the last additional fuel injection at a value as great as possible.

In this embodiment, the correction of the fuel quantity based on the catalyst temperature θc.c is performed by adjusting the number of cylinders for use in performing the additional fuel injection in the expansion stroke. However, it is also possible to adjust the injection quantity of the additional fuel to each cylinder as in the first embodiment.

Needless to say, the present invention is not limited to the above-described embodiments. For example, in each of the above described embodiments, the quantity of oxygen remaining at the time of primary combustion is determined from the quantity Q of air inducted per cylinder and the target A/F and upon conducting an expansion-stroke injection, the quantity of fuel to be injected through the fuel injection valve 8 is determined based on the oxygen quantity. However, this injection quantity can also be set as such a fixed injection quantity that the fuel so injected can undergo additional combustion.

Further, in each of the above-described embodiment, the catalyst temperature sensor 26 is arranged as a purification device temperature computing unit. The catalyst temperature θc.c is detected directly by the catalyst temperature sensor 26. Based on the detection result, it is determined whether or not the catalyst 9 requires heating (as a unit having this function, a catalyst heating determination unit is arranged). If the catalyst is determined to require heating, the expansion-stroke injection is then performed. With a view to achieve simplification of the control, the expansionstroke injection can also be performed based on an output from a start-up engine temperature detection unit for detecting if the engine temperature (coolant temperature) at the time of a start-up is not higher than a preset temperature or from an elapsed time detection unit for detecting an elapse of a time period from a start-up (a variable or fixed, predetermined time period set depending on the coolant temperature or the like at the time of a start-up). As a further alternative, the expansion-stroke injection can be always performed shortly after a start-up on the basis of an output from a start-up detection unit. Incidentally, the engine temperature detection unit, the elapsed time detection unit and the start-up detection unit correspond to the catalyst temperature sensor 26 as a purification device temperature computing unit in each of the above-described embodiments.

Moreover, in the above-described second embodiment, the cylinder designating unit 118B is arranged. By this cylinder designating unit 118B, the number of cylinders for use in performing the expansion-stroke injection is varied (including use of all the cylinders) depending on the catalyst temperature θc.c. As an alternative, it is also possible, for example, to designate beforehand one or more particular cylinders (predetermined cylinders) for use in performing the expansion-stroke injection instead of changing the cylinders to be used in performing the expansion-stroke injection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust gas heating system for an in-cylinder injection internal combustion engine, comprising:
    a fuel injection device for injecting fuel directly into a combustion chamber of the internal combustion engine;
    a spark plug for subjecting fuel, which has been injected as primary fuel from said fuel injection device, to spark ignition so that said primary fuel undergoes primary combustion;
    an exhaust gas purification device arranged in an exhaust passage of the internal combustion engine;
    a purification device temperature computing unit for detecting a temperature of said exhaust gas purification device by detecting or estimating said temperature of said exhaust gas purification device; and
    an additional fuel injection control unit for controlling said fuel injection device to inject additional fuel when said detected temperature of said exhaust gas purification device is equal to or lower than a predetermined value, such that the additional fuel is injected during a flame lasting duration that a flame of said primary combustion based on said injection of said primary fuel remains,
    wherein said additional fuel injection control unit includes an injection timing setting unit for setting an injection start time of said additional fuel on a basis of a parameter which affects said flame lasting duration.

2. The system of claim 1, wherein said injection timing setting unit includes an injection quantity computing unit for determining said injection quantity of said additional fuel on a basis of at least one of a directly and indirectly-detected quantity of oxygen still remaining after said primary combustion, an injecting duration setting unit for setting an injecting duration, which corresponds to said injection quantity of said additional fuel determined by said injection quantity computing unit, and an injection start time setting unit for setting an injection start time of said additional fuel on the basis of said parameter which affects said flame lasting duration.

3. The system of claim 2, wherein said injection start time setting unit includes,
    a basic injection start time setting unit for determining a basic injection start time on a basis of an engine speed and an engine load of said internal combustion engine, and
    a flame dying time computing unit for determining an injection start time correction factor on the basis of said parameter, which affects said flame lasting duration, while taking into consideration a flame dying time as an ending time of said flame lasting duration,
    wherein said injection start time setting unit sets said injection start time of said additional fuel on a basis of said basic injection start time determined by said basic injection start time setting unit and said injection start time correction factor determined by said flame dying time computing unit, so that said injection of said additional fuel is started at a timing where said additional fuel can be ignited by said flame of said primary combustion.

4. The system of claim 3, wherein said flame dying time computing unit determines said injection start time correction factor on a basis of at least one of an engine temperature of said internal combustion engine, an exhaust gas recirculation rate at a time of said primary combustion, an air/fuel ratio at the time of said primary combustion, and an ignition timing at the time of said primary combustion as said parameter which affects said flame lasting duration.

5. The system of claim 4, wherein the internal combustion engine includes an engine temperature detection unit for detecting said engine temperature, and
    said flame dying time computing unit includes a first injection start time correction map indicating a first injection start time correction factor which has been set while taking into consideration said flame dying time which advances as said engine temperature becomes lower, wherein
    said injection start time setting unit sets said injection start time of said additional fuel on a basis of said first injection start time correction factor which has been determined from said first injection start time correction map on the basis of said engine temperature detected by said engine temperature detection unit.

6. The system of claim 4, wherein the internal combustion engine is provided with an exhaust gas recirculation rate control unit for controlling an exhaust gas recirculation rate by opening or closing an on/off valve in an exhaust gas recirculation passage which communicates said exhaust passage and said intake passage with each other, and
    said flame dying time computing unit includes a second injection start time correction map indicating a second injection start time correction factor which has been set while taking into consideration said flame dying time which varies in accordance with said exhaust gas recirculation rate, wherein
    said injection start time setting unit sets said injection start time of said additional fuel on a basis of said second injection start time correction factor which has been determined from said second injection start time correction map on the basis of said exhaust gas recirculation rate controlled by said exhaust gas recirculation rate control unit.

7. The system of claim 4, wherein the internal combustion engine is provided with a conventional fuel injection control unit for controlling an injection of fuel at the time of said primary combustion in accordance with operation conditions of said internal combustion engine, and said flame dying time computing unit includes a third injection start time correction map indicating a third injection start time correction factor which has been set while taking into consideration said flame dying time which delays as an air/fuel ratio at the time of said primary combustion becomes leaner, wherein said injection start time setting unit sets said injection start time of said additional fuel on a basis of said third injection start time correction factor which has been determined from said third injection start time correction map on the basis of said air/fuel ratio at the time of said primary combustion set by said conventional combustion injection control unit.

8. The system of claim 4, wherein the internal combustion engine is provided with an ignition timing control unit for controlling an ignition timing of said primary fuel, which has been injected from said fuel injection device, by said spark plug, and said flame dying time computing unit includes a fourth injection start time correction map indicating a fourth injection start time correction factor which has been set while taking into consideration said flame dying time which delays as an ignition timing at the time of said primary combustion is retarded, wherein said injection start time setting unit sets said injection start time of said additional fuel on a basis of said fourth injection start time correction factor which has been determined from said fourth injection start time correction map on the basis of said ignition timing set by said ignition timing control unit.

9. The system of claim 3, wherein said injection start time setting unit sets said injection start time of said additional fuel at a timing close to said flame dying time of said flame lasting duration.

10. The system of claim 2, wherein said injection start time setting unit includes a flame lasting duration adjusting unit for adjusting said flame lasting duration, said flame lasting duration adjusting unit has a control unit for adjusting a control amount for said parameter and a storage unit for storing flame lasting durations corresponding to predetermined control amounts for said parameter, wherein said flame lasting duration adjusting unit adjusts said flame lasting duration by obtaining from said storage unit one of said predetermined control amounts for said parameter, said one control amount being required to make said ending time of said flame lasting duration become equal to a flame dying time corresponding to a degree of activation required for said exhaust gas purification device, and then adjusting said parameter through said control unit to give said one control amount, and said injection start time setting unit sets said injection start time of said additional fuel within said flame lasting duration adjusted by said flame lasting duration adjusting unit.

11. The system of claim 10, wherein the internal combustion engine is provided with an exhaust gas recirculation rate control unit for controlling an exhaust gas recirculation rate by opening or closing an on/off valve in an exhaust gas recirculation passage which communicates said exhaust passage and said intake passage with each other, said storage unit includes a first map indicating flame dying times corresponding to control amounts for said exhaust gas recirculation rate, and said flame lasting duration adjusting unit obtains from said first map one of said control amounts on a basis of a flame lasting duration corresponding to a temperature determined by said purification device temperature computing unit, and controls said exhaust gas recirculation rate control unit through said control unit to give said one control amount.

12. The system of claim 10, wherein the internal combustion engine is provided with an ignition timing control unit for controlling an ignition timing of said spark plug, at which said primary fuel injected from said fuel injection device is subjected to spark ignition, said storage unit includes a second map indicating flame dying times corresponding to control amounts for said ignition timing of said primary combustion; and said flame lasting duration adjusting unit obtains from said second map one of said control amounts on a basis of a flame lasting duration corresponding to a temperature determined by said purification device temperature computing unit, and controls said ignition timing control unit through said control unit to give said one control amount.

13. The system of claim 10, wherein the internal combustion engine is provided with a conventional fuel injection control unit for controlling said fuel injection at the time of said primary combustion in accordance with operation conditions, said storage unit includes a third map indicating flame dying times corresponding to control amounts for said air/fuel ratio of said primary combustion, and said flame lasting duration adjusting unit obtains from said third map one of said control amounts on a basis of a flame lasting duration corresponding to a temperature determined by said purification device temperature computing unit, and controls said conventional fuel injection control unit through said control unit to give said one control amount.

14. The system of claim 2, wherein said injection timing setting unit includes a first injecting duration correcting unit for correcting a basic injecting duration determined by said injecting duration setting unit in accordance with a temperature of said exhaust gas purification device determined by said purification device temperature computing unit.

15. The system of claim 14, wherein said first injecting duration correcting unit has a correcting factor setting unit for correcting said basic injecting duration by a first injecting duration correcting factor, which has been predetermined corresponding to said temperature of said exhaust gas purification device, so that the injection quantity of said additional fuel becomes smaller as said temperature of said exhaust gas purification device rises.

16. The system of claim 14, wherein the internal combustion engine include plural cylinders, and said first injecting duration correcting unit has a cylinder designating unit which, based on a cylinder number map preset corresponding to temperatures of said exhaust gas purification device, decreases a number of additional-injection-performed cylinders as said temperature of said exhaust gas purification device rises.

17. The system of claim 2, wherein said injecting duration setting unit includes a second injecting duration correcting unit which, by a second injecting duration correcting factor predetermined corresponding to said injection start time of said additional fuel in said expansion stroke of said primary combustion, corrects said basic injecting duration determined by said injecting duration setting unit so that an actual injection quantity conforms with said injection quantity of said additional fuel determined by said injection quantity computing unit.

18. The system of claim 1, wherein said additional fuel injection control unit includes an injection quantity computing unit for determining said injection quantity of said additional fuel on a basis of at least one of a directly and indirectly-detected quantity of oxygen still remaining after said primary combustion, and said injection timing setting unit is provided with a divided injection start time setting unit which sets injection start times of plural divided injections so that said injection quantity of said additional fuel determined by said injection quantity computing unit is divided and injected in like plural portions.

19. The system of claim 18, wherein, when said injection quantity of said additional fuel is injected by dividing the same in N portions, said divided injection start time setting unit sets an injection start time of an $N^{th}$ divided injection at a timing immediate before said exhaust valve opens.

20. The system of claim 18, wherein said injection timing setting unit is provided with an injecting duration setting unit which, when said injection quantity of said additional fuel is injected by dividing the same in N portions, sets an $N-1^{th}$ divided injecting duration and an $N^{th}$ divided injecting duration so that an $N-1^{th}$ divided injection quantity becomes smaller than an $N^{th}$ divided injection quantity.

21. The system of claim 18, wherein said injecting duration setting unit includes third injecting duration correcting factors predetermined corresponding to values of said engine temperature and, when said injection quantity of said additional fuel is injected by dividing the same in N portions, said injecting duration setting unit sets an $N-1^{th}$ divided injecting duration and an $N^{th}$ divided injecting duration by said third injecting duration correcting factors so that an $N-1^{th}$ divided injection quantity becomes still smaller than an $N^{th}$ divided injection quantity as said engine temperature rises.

22. The system of claim 2, wherein said injection start time setting unit sets said injection start time such that, when said temperature of said exhaust gas purification device determined by said purification device temperature computing unit is lower than a preset temperature permitting combustion of an unburnt fuel portion within said exhaust purification device, said injection of said additional fuel is effected within said flame lasting duration in which the flame of said primary combustion based on said injection of said primary fuel remains; and, when said temperature of said exhaust purification device is equal to or higher than said preset temperature, said injection start time setting unit sets said injection start time so that said injection of said additional fuel is performed after said flame lasting duration.

23. An exhaust gas heating system for an in-cylinder injection internal combustion engine, comprising:

a fuel injection device for injecting fuel directly into a combustion chamber of the internal combustion engine;

a spark plug for subjecting fuel, which has been injected as primary fuel from said fuel injection device, to spark ignition so that said primary fuel undergoes primary combustion;

an exhaust gas purification device arranged in an exhaust passage of said internal combustion engine; and an additional fuel injection control unit for controlling said fuel injection device so that, when said exhaust gas purification device is found to require activation of a catalyst thereof, fuel is injected as additional fuel within a flame lasting duration in which a flame of said primary combustion remains, wherein said additional fuel injection control unit includes, an injection quantity computing unit for determining an injection quantity of said additional fuel on a basis of at least one of a directly and indirectly-detected quantity of oxygen still remaining after said primary combustion, and an injection timing setting unit including an injecting duration setting unit for setting a basic injecting duration corresponding to said injection quantity of said additional fuel determined by said injection quantity computing unit, and an injection start time setting unit for setting an injection start time of said additional fuel on a basis of a parameter which affects said flame lasting duration, and said injection start time setting unit, upon starting up said internal combustion engine at a low temperature, sets said injection start time such that said injection of said additional fuel is effected within said flame lasting duration and, in an operation state from which said exhaust gas purification device is expected to be reduced in temperature, sets said injection start time such that said injection of said additional fuel is effected after said flame lasting duration.

24. A catalyst heating system for an in-cylinder injection internal combustion engine, comprising:

a fuel injection unit for injecting fuel directly into a combustion chamber;

a spark ignition unit for igniting a primary fuel injected by the fuel injection unit;

a temperature sensor for detecting a temperature of the catalyst;

a comparing unit for comparing the detected temperature with a predetermined value; and an additional fuel injection control unit for injecting additional fuel from said fuel injection unit during a flame lasting duration period of the ignited primary fuel when the detected temperature is equal to or lower than the predetermined value to increase the temperature of the catalyst.

25. A method of heating exhaust gas in an in-cylinder injection internal combustion engine, comprising:

injecting a primary fuel directly into a combustion chamber;

igniting the primary fuel by a spark plug;

detecting a temperature of an exhaust gas purification device arranged in an exhaust passage of the engine;

comparing the detected temperature of an exhaust gas purification device with a predetermined value;

executing a secondary fuel injection control to increase the temperature of the exhaust gas when the detected temperature is equal to or lower than the predetermined value, and injecting the secondary fuel during a flame lasting duration period of the ignited primary fuel, such that the secondary fuel is ignited by the lasting flame of the primary fuel.

26. The method of claim 25, wherein said executing step includes the step of, setting an injection start time of said secondary fuel based on a parameter which affects the flame lasting duration.

27. An exhaust gas heating system for an in-cylinder injection internal combustion engine, comprising:

a fuel injection device for injecting fuel directly into a combustion chamber of the internal combustion engine;

a spark plug for subjecting fuel, which has been injected as primary fuel from said fuel injection device, to spark ignition so that said primary fuel undergoes primary combustion;

an exhaust gas purification device arranged in an exhaust passage of the internal combustion engine;

a purification device temperature computing unit for detecting a temperature of said exhaust gas purification device by detecting or estimating said temperature of said exhaust gas purification device; and an additional fuel injection control unit for controlling said fuel injection device when said exhaust gas purification device is found to require activation from said temperature determined by said purification device temperature computing unit, such that an additional fuel is injected during a flame lasting duration that a flame of said primary combustion based on said injection of said primary fuel remains, wherein said additional fuel injection control unit includes an injection timing setting unit for setting an injection start time of said additional fuel on a basis of a parameter which affects said flame lasting duration, and wherein said injection timing setting unit includes an injection quantity computing unit for determining said injection quantity of said additional fuel on a basis of at least one of a directly and indirectly-detected quantity of oxygen still remaining after said primary combustion, an injection duration setting unit for setting an injecting duration, which corresponds to said injection quantity of said additional fuel determined by said injection quantity computing unit, and an injection start time setting unit for setting an injection start time of said additional fuel on the basis of said parameter which affects said flame lasting duration.

28. An exhaust gas heating system for an in-cylinder injection internal combustion engine, comprising:

a fuel injection device for injecting fuel directly into a combustion chamber of the internal combustion engine;

a spark plug for subjecting fuel, which has been injected as primary fuel from said fuel injection device, to spark ignition so that said primary fuel undergoes primary combustion;

an exhaust gas purification device arranged in an exhaust passage of the internal combustion engine;

a purification device temperature computing unit for detecting a temperature of said exhaust gas purification device by detecting or estimating said temperature of said exhaust gas purification device; and an additional fuel injection control unit for controlling said fuel injection device when said exhaust gas purification device is found to require activation from said temperature determined by said purification device temperature computing unit, such that an additional fuel is injected during a flame lasting duration that a flame of said primary combustion based on said injection of said primary fuel remains, wherein said additional fuel injection control unit includes an injection timing setting unit for setting an injection start time of said additional fuel on a basis of a parameter which affects said flame lasting duration, and wherein said additional fuel injection control unit includes an injection quantity computing unit for determining said injection quantity of said additional fuel on a basis of at least one of a directly and indirectly-detected quantity of oxygen still remaining after said primary combustion, and said injection timing setting unit is provided with a divided injection start time setting unit which sets injection start times of plural divided injections so that said injection quantity of said additional fuel determined by said injection quantity computing unit is divided and injected in like plural portions.

29. An exhaust gas heating system for an in-cylinder injection internal combustion engine, comprising:

a fuel injection device for injecting fuel directly into a combustion chamber of the internal combustion engine;

a spark plug for subjecting fuel, which has been injected as primary fuel from said fuel injection device, to spark ignition so that said primary fuel undergoes primary combustion;

an exhaust gas purification device arranged in an exhaust passage of the internal combustion engine;

a purification device temperature computing unit for detecting a temperature of said exhaust gas purification device by detecting or estimating said temperature of said exhaust gas purification device; and an additional fuel injection control unit for controlling said fuel injection device when said exhaust gas purification device is found to require activation from said temperature determined by said purification device temperature computing unit, such that an additional fuel is injected during a flame lasting duration that a flame of said primary combustion based on said injection of said primary fuel remains, wherein said additional fuel injection control unit includes an injection timing setting unit for setting an injection start time of said additional fuel on a basis of a parameter which affects said flame lasting duration, and said injection timing setting unit sets the injection start timing of said additional fuel on a basis of at least one of a temperature of said internal combustion engine, an exhaust gas recirculation rate, an air/fuel ratio, and an ignition timing, as said parameter.

* * * * *